(12) United States Patent
Harada

(10) Patent No.: US 11,608,611 B2
(45) Date of Patent: Mar. 21, 2023

(54) CONTROL SYSTEM FOR WORK VEHICLE, METHOD, AND WORK VEHICLE

(71) Applicant: KOMATSU LTD., Tokyo (JP)

(72) Inventor: Junji Harada, Tokyo (JP)

(73) Assignee: KOMATSU LTD., Tokyo (JP)

( * ) Notice: Subject to any disclaimer, the term of this patent is extended or adjusted under 35 U.S.C. 154(b) by 507 days.

(21) Appl. No.: 16/644,528

(22) PCT Filed: Feb. 19, 2019

(86) PCT No.: PCT/JP2019/006102
§ 371 (c)(1),
(2) Date: Mar. 5, 2020

(87) PCT Pub. No.: WO2019/187797
PCT Pub. Date: Oct. 3, 2019

(65) Prior Publication Data
US 2020/0263389 A1     Aug. 20, 2020

(30) Foreign Application Priority Data

Mar. 28, 2018   (JP) .............................. JP2018-062773

(51) Int. Cl.
*E02F 9/20*    (2006.01)
*E02F 3/84*    (2006.01)
(Continued)

(52) U.S. Cl.
CPC .............. *E02F 9/205* (2013.01); *E02F 3/847* (2013.01); *B60Y 2200/411* (2013.01);
(Continued)

(58) Field of Classification Search
CPC ......... E02F 9/205; E02F 9/0866; E02F 3/847; E02F 3/7618; B60Y 2200/411; G05B 11/01; G05D 2201/0202
See application file for complete search history.

(56) References Cited

U.S. PATENT DOCUMENTS

| 5,950,141 A | 9/1999 | Yamamoto et al. |
| 2011/0153170 A1 | 6/2011 | Dishman et al. |
| (Continued) | | |

FOREIGN PATENT DOCUMENTS

| CN | 1165225 A | 11/1997 |
| JP | 2013-515885 A | 5/2013 |
| (Continued) | | |

OTHER PUBLICATIONS

Examination report No. 1 for the corresponding Australian application No. 2019246100, dated Feb. 24, 2021.
(Continued)

*Primary Examiner* — Russell Frejd
(74) *Attorney, Agent, or Firm* — Global IP Counselors, LLP

(57) ABSTRACT

A work vehicle includes a work implement. A control system for the work vehicle includes a controller that controls the work implement. The controller obtains a first design topography. The controller determines a second design topography. At least a portion of the second design topography is positioned above the first design topography. The controller generates a command signal to operate the work implement in accordance with the second target design topography. The controller changes a tilt angle of the work implement when at least a portion of the second design topography is positioned below the first design topography.

13 Claims, 28 Drawing Sheets

(51) Int. Cl.
  *E02F 3/76* (2006.01)
  *E02F 9/08* (2006.01)
  *G05B 11/01* (2006.01)

(52) U.S. Cl.
  CPC .......... *E02F 3/7618* (2013.01); *E02F 9/0866* (2013.01); *G05B 11/01* (2013.01); *G05D 2201/0202* (2013.01)

(56) References Cited

U.S. PATENT DOCUMENTS

| | | |
|---|---|---|
| 2011/0153171 A1 | 6/2011 | Krause et al. |
| 2013/0081831 A1 | 4/2013 | Hayashi |
| 2014/0180444 A1 | 6/2014 | Edara et al. |
| 2020/0299934 A1* | 9/2020 | Ono .................. E02F 3/7654 |
| 2021/0108395 A1* | 4/2021 | Harada ............... E02F 9/2045 |

FOREIGN PATENT DOCUMENTS

| | | |
|---|---|---|
| JP | 2013-515886 A | 5/2013 |
| JP | 5247939 B1 | 7/2013 |
| JP | 2016-132912 A | 7/2016 |
| JP | 2018-21427 A | 2/2018 |

OTHER PUBLICATIONS

The International Search Report for the corresponding international application No. PCT/JP2019/006102, dated May 14, 2019.
The Office Action for the corresponding Chinese application No. 201980004436.9, dated Jun. 3, 2021.

* cited by examiner

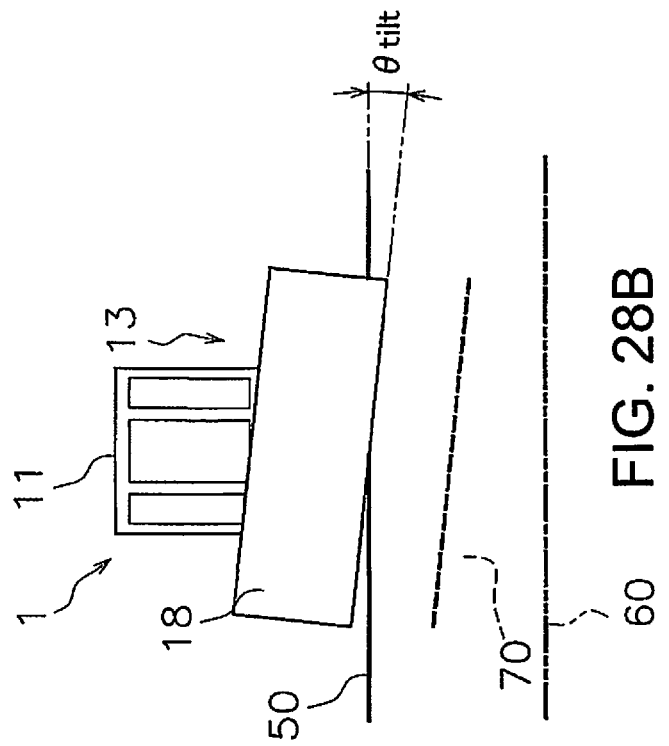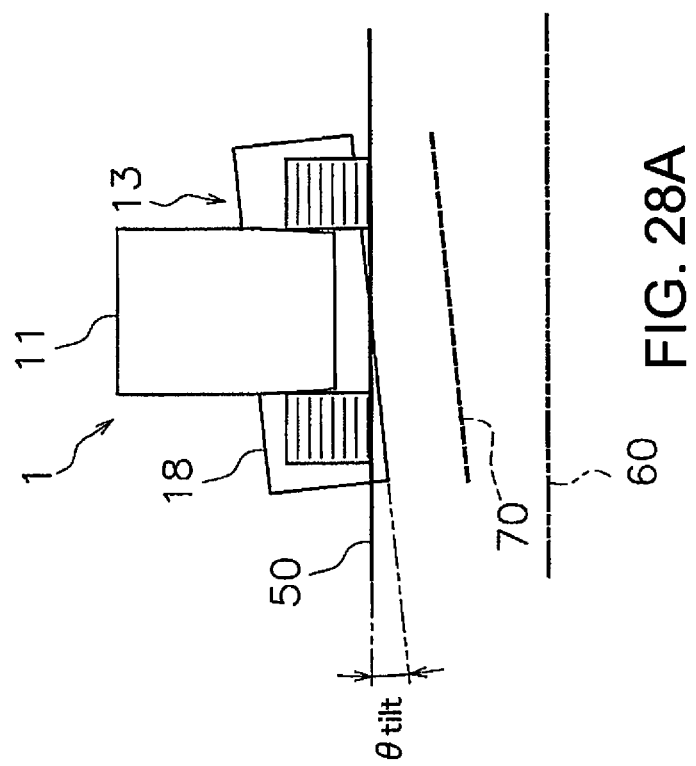

CONTROL SYSTEM FOR WORK VEHICLE, METHOD, AND WORK VEHICLE

CROSS-REFERENCE TO RELATED APPLICATIONS

This application is a U.S. National stage application of International Application No. PCT/JP2019/006102, filed on Feb. 19, 2019. This U.S. National stage application claims priority under 35 U.S.C. § 119(a) to Japanese Patent Application No. 2018-062773, filed in Japan on Mar. 28, 2018, the entire contents of which are hereby incorporated herein by reference.

BACKGROUND

Field of the Invention

The present invention relates to a control system for a work vehicle, a method, and a work vehicle.

Background Information

A control for automatically adjusting the position of a work implement such as a blade has been conventionally proposed for work vehicles such as bulldozers or graders and the like. For example, Japanese Patent Publication No. 5247939 describes automatically adjusting a blade by controlling the load so that the load applied to the blade matches a target load during excavating work.

SUMMARY

According to the abovementioned conventional control, the occurrence of shoe slip can be suppressed by raising the blade when the load on the blade becomes excessive. As a result, work can be performed with good efficiency.

However, as illustrated in FIG. 30, first the blade is controlled so as to follow a design topography 100 in the conventional control. Thereafter, when the load on the blade becomes large, the blade is raised due to the load control (see the locus 200 of the blade in FIG. 30). Therefore, when the blade is in a position that is deep in the design topography 100 with respect to the actual topography 300, the load applied to the blade increases very quickly whereby the blade may be raised very quickly. In this case, because the terrain is formed with large undulations, it may be difficult to carry out excavating work smoothly. Moreover, there is a concern that the excavated terrain may easily become rough and the quality of the finish may decrease.

An object of the present invention is to cause a work vehicle to perform work efficiently and with a good finish quality with automatic control.

A first aspect is a control system for a work vehicle including a work implement, the control system including a controller. The controller is programmed to execute the following processes. The controller obtains a first design topography. The controller determines a second design topography at least a portion of which is positioned above the first design topography. The controller generates a command signal to operate the work implement in accordance with the second target design topography. The controller changes a tilt angle of the work implement when at least a portion of the second design topography is positioned below the first design topography.

A second aspect is a method executed by a controller for controlling a work vehicle including a work implement, the method including the following processes. A first process includes obtaining a first target design topography. A second process includes determining a second design topography at least a portion of which is positioned above the first design topography. A third process includes generating a command signal to operate the work implement in accordance with the second target design topography. A fourth process includes changing a tilt angle of the work implement when at least a portion of the second design topography is positioned below the first design topography.

A third aspect is a work vehicle, the work vehicle including a work implement and a controller for controlling the work implement. The controller is programmed to execute the following processes. The controller obtains a first design topography. The controller determines a second design topography at least a portion of which is positioned above the first design topography. The controller generates a command signal to operate the work implement in accordance with the second target design topography. The controller changes a tilt angle of the work implement when at least a portion of the second design topography is positioned below the first design topography.

According to the present invention, a work vehicle can be made to perform work efficiently and with a good finish quality with automatic control.

BRIEF DESCRIPTION OF DRAWINGS

FIG. 28A and FIG. 28B illustrate a second example of the second tilt angle control.

DETAILED DESCRIPTION OF EMBODIMENT(S)

Figure 1:
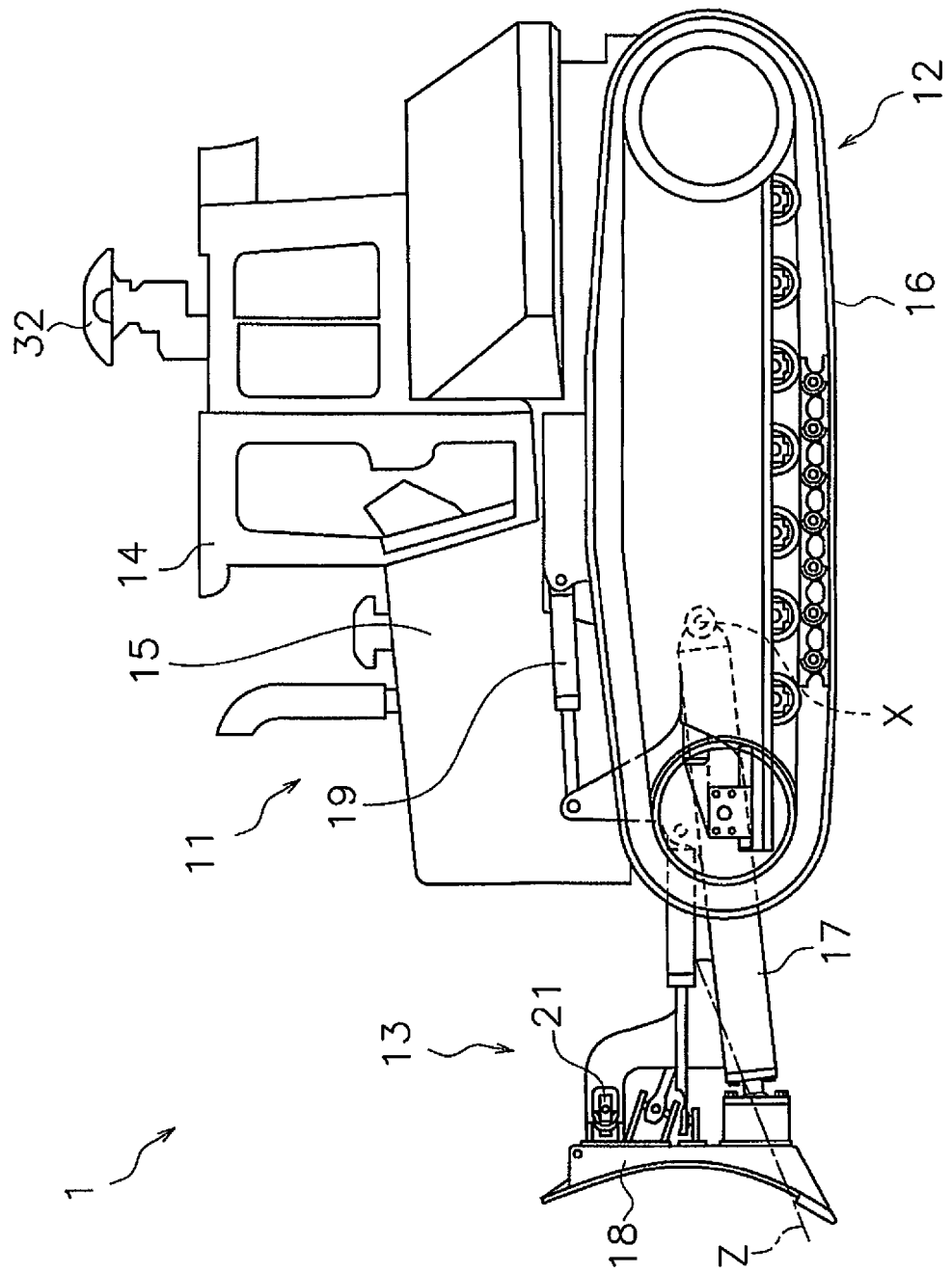
FIG. 1 is a side view of a work vehicle according to an embodiment.

A work vehicle according to an embodiment is discussed hereinbelow with reference to the drawings. FIG. 1 is a side view of the work vehicle 1 according to an embodiment. The work vehicle 1 according to the present embodiment is a bulldozer. The work vehicle 1 includes a vehicle body 11, a travel device 12, and a work implement 13.

The vehicle body 11 has an operating cabin 14 and an engine compartment 15. An operator's seat that is not illustrated is disposed inside the operating cabin 14. The engine compartment 15 is disposed in front of the operating cabin 14. The travel device 12 is attached to a bottom part of the vehicle body 11. The travel device 12 has a pair of left and right crawler belts 16. Only the crawler belt 16 on the left side is illustrated in FIG. 1. The work vehicle 1 travels due to the rotation of the crawler belts 16.

The work implement 13 is attached to the vehicle body 11. The work implement 13 has a lift frame 17, a blade 18, a lift cylinder 19, and a tilt cylinder 21. The lift frame 17 is attached to the vehicle body 11 in a manner that allows movement up and down centered on an axis X that extends in the vehicle width direction. The lift frame 17 supports the blade 18.

The blade 18 is disposed in front of the vehicle body 11. The blade 18 moves up and down accompanying the up and down movements of the lift frame 17. The lift frame 17 may be attached to the travel device 12. The lift cylinder 19 is coupled to the vehicle body 11 and the lift frame 17. Due to the extension and contraction of the lift cylinder 19, the lift frame 17 rotates up and down centered on the axis X. The tilt cylinder 21 is coupled to the lift frame 17 and the blade 18. Due to the extension and contraction of the tilt cylinder 21, the blade 18 rotates (referred to below as a "tilting motion") around an axis Z that extends in the front-back direction of the vehicle.

Figure 2:
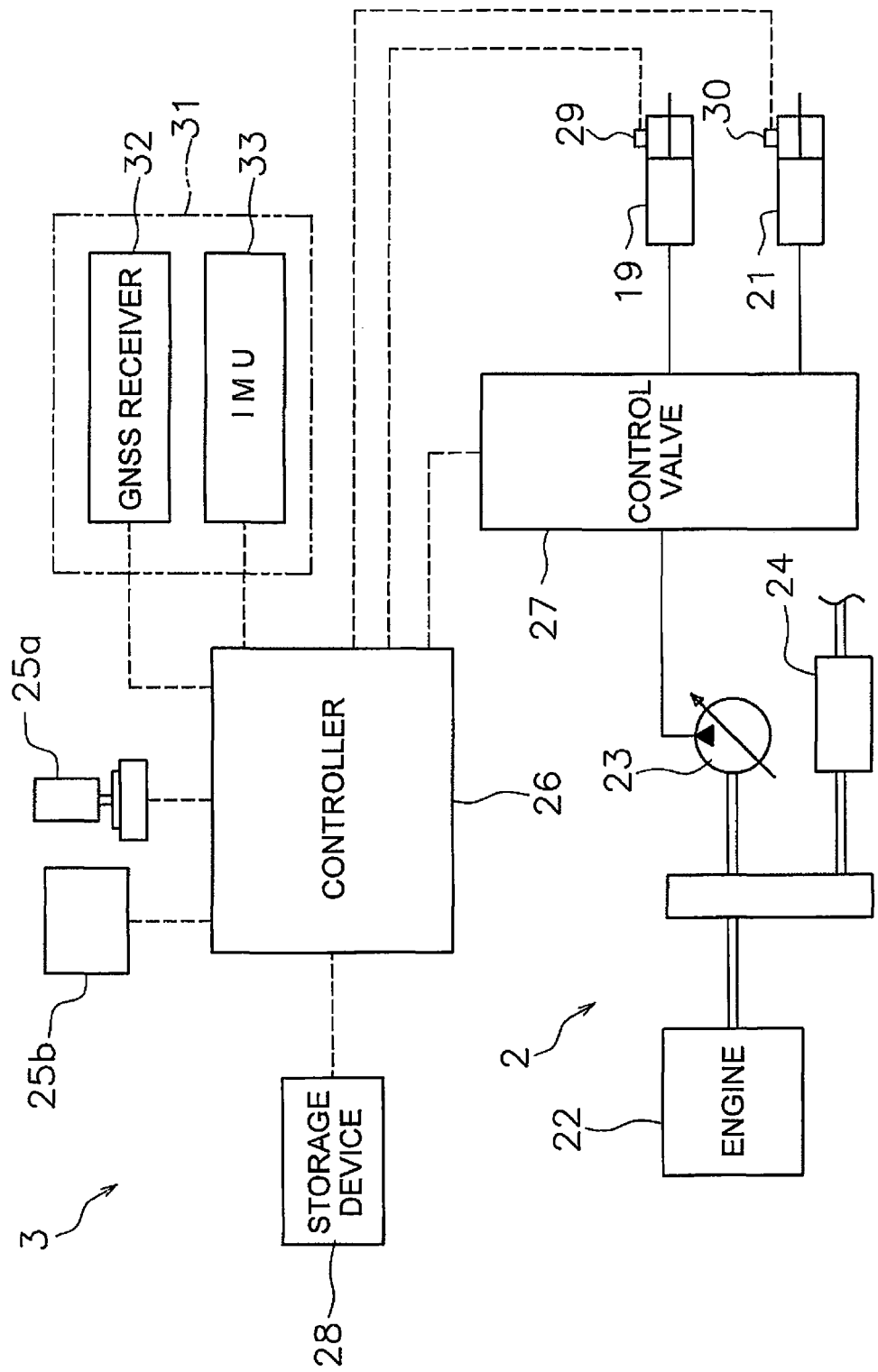
FIG. 2 is a block diagram of a configuration of a drive system and a control system of the work vehicle.

FIG. 2 is a block diagram of a configuration of a drive system 2 and a control system 3 of the work vehicle 1. As illustrated in FIG. 2, the drive system 2 includes an engine 22, a hydraulic pump 23, and a power transmission device 24.

The hydraulic pump 23 is driven by the engine 22 to discharge hydraulic fluid. The hydraulic fluid discharged from the hydraulic pump 23 is supplied to the lift cylinder 19 and the tilt cylinder 21. While only one hydraulic pump 23 is illustrated in FIG. 2, a plurality of hydraulic pumps may be provided.

The power transmission device 24 transmits driving power from the engine 22 to the travel device 12. The power transmission device 24 may be a hydrostatic transmission (HST), for example. Alternatively, the power transmission device 24 may be, for example, a transmission including a torque converter or a plurality of speed change gears.

The control system 3 includes an operating device 25a, an input device 25b, a controller 26, a storage device 28, and a control valve 27. The operating device 25a and the input device 25b are disposed in the operating cabin 14. The operating device 25a is a device for operating the work implement 13 and the travel device 12. The operating device 25a is disposed in the operating cabin 14. The operating device 25a receives operations from an operator for driving the work implement 13 and the travel device 12, and outputs operation signals in accordance with the operations. The operating device 25a includes, for example, an operating lever, a pedal, and a switch and the like.

The input device 25b is a device for setting a below mentioned automatic control of the work vehicle 1. The input device 25b receives an operation by an operator and outputs an operation signal corresponding to the operation. The operation signals of the input device 25b are output to the controller 26. The input device 25b is, for example, a touch screen display. However, the input device 25b is not limited to a touch screen and may include hardware keys.

The controller 26 is programmed so as to control the work vehicle 1 based on obtained data. The controller 26 includes, for example, a processing device (processor) such as a CPU. The controller 26 obtains operation signals from the operating device 25a and the input device 25b. The controller 26 is not limited to one component and may be divided into a plurality of controllers. The controller 26 controls the travel device 12 or the power transmission device 24 thereby causing the work vehicle 1 to travel. The controller 26 controls the control valve 27 thereby causing the blade 18 to move up and down. The controller 26 controls the control valve 27 thereby causing the blade 18 to tilt.

The control valve 27 is a proportional control valve and is controlled with command signals from the controller 26. The control valve 27 is disposed between the hydraulic pump 23 and hydraulic actuators such as the lift cylinder 19 and the tilt cylinder 21. The control valve 27 controls the flow rate of the hydraulic fluid supplied from the hydraulic pump 23 to the lift cylinder 19 and the tilt cylinder 21. The controller 26 generates a command signal for the control valve 27 so that the blade 18 moves. As a result, the lift cylinder 19 and the tilt cylinder 21 are controlled. The control valve 27 may also be a pressure proportional control valve. Alternatively, the control valve 27 may be an electromagnetic proportional control valve.

Figure 3:
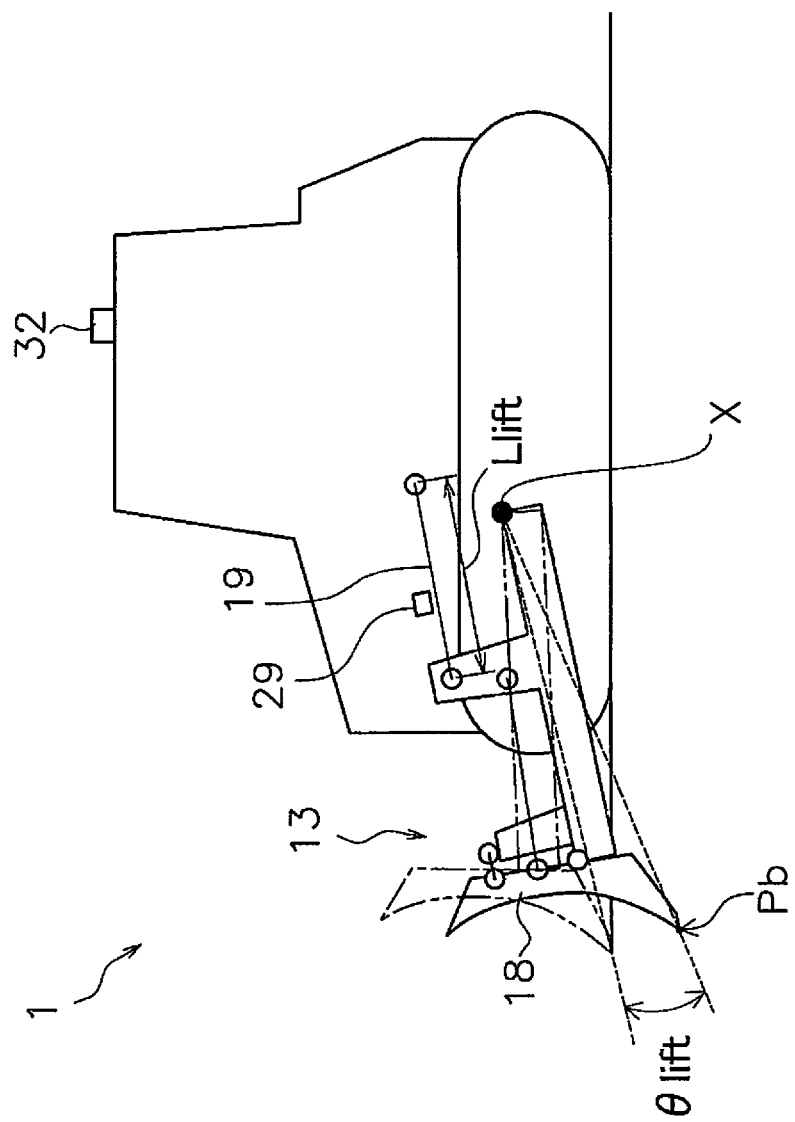
FIG. 3 is a schematic side view of a configuration of the work vehicle.

The control system 3 includes a lift sensor 29 and a tilt sensor 30. The left sensor 29 detects the position of the work implement 13 in the vertical direction and outputs a work implement position signal which indicates the position of the work implement 13 in the vertical direction. The lift sensor 29 may be a displacement sensor that detects displacement of the work implement 13. Specifically, the lift sensor 29 detects the stroke length (referred to below as "lift cylinder length Llift") of the lift cylinder 19. FIG. 3 is a schematic side view of a configuration of the work vehicle 1. As illustrated in FIG. 3, the controller 26 calculates a lift angle θlift of the blade 18 based on the lift cylinder length Llift. The lift sensor 29 may also be a rotation sensor that directly detects the rotation angle of the work implement 13.

The reference position of the work implement 13 is depicted as a chain double-dashed line in FIG. 3. The reference position of the work implement 13 is the position of the blade 18 while the blade tip of the blade 18 is in contact with the ground surface on a horizontal ground surface. The lift angle θlift is the angle from the reference position of the work implement 13.

Figure 4:
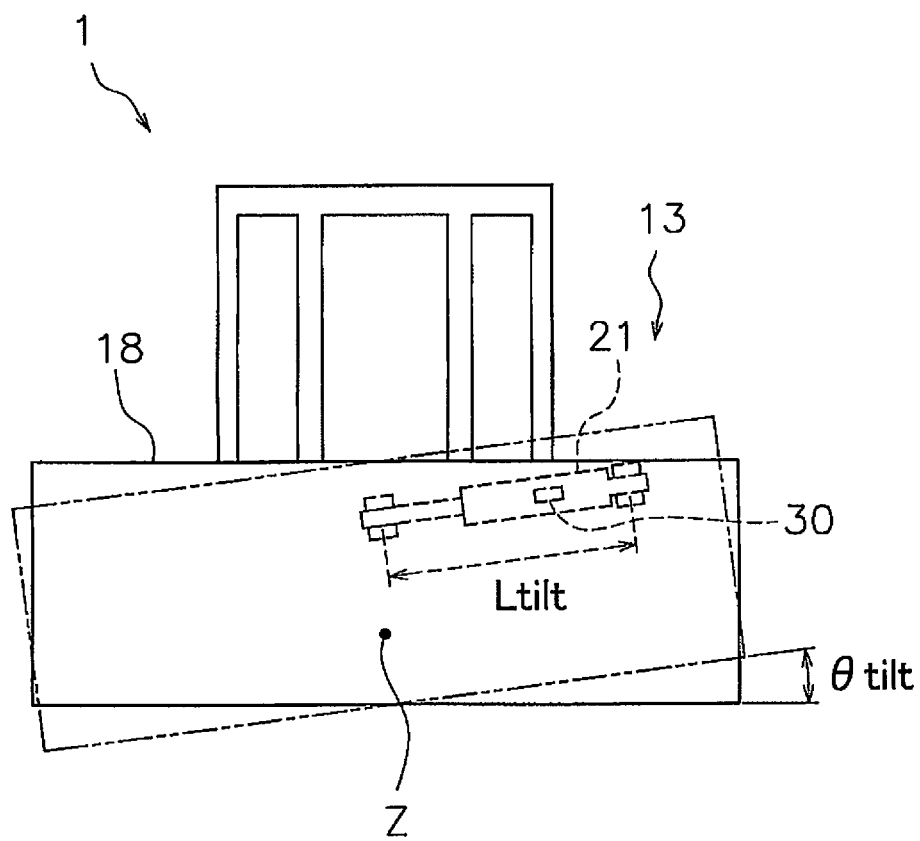
FIG. 4 is a schematic front view of a configuration of the work vehicle.

The tilt sensor 30 detects the tilt angle of the work implement 13 and outputs a work implement position signal which indicates the tilt angle of the work implement 13. The tilt sensor 30 may be a displacement sensor that detects displacement of the work implement 13. Specifically, the tilt sensor 30 detects a stroke length of the tilt cylinder 21 (referred to below as "tilt cylinder length"). FIG. 4 is a schematic front view of a configuration of the work vehicle 1. As illustrated in FIG. 4, the controller 26 calculates a tilt angle θtilt of the blade 18 based on the tilt cylinder length. The tilt sensor 30 may also be a rotation sensor that directly detects the rotation angle of the work implement 13.

As illustrated in FIG. 2, the control system 3 includes a positional sensor 31. The positional sensor 31 measures the position of the work vehicle 1. The positional sensor 31 includes a global navigation satellite system (GNSS) receiver 32 and an IMU 33. The GNSS receiver 32 is, for example, a receiving apparatus for a global positioning system (GPS). For example, an antenna of the GNSS receiver 32 is disposed on the operating cabin 14. The GNSS receiver 32 receives a positioning signal from a satellite, computes the position of the antenna from the positioning signal, and generates vehicle body position data. The controller 26 obtains the vehicle body position data from the GNSS receiver 32. The controller 26 derives the traveling direction and the vehicle speed of the work vehicle 1 from the vehicle body position data.

The vehicle body position data may not be data of the antenna position. The vehicle body position data may be data that indicates a position of an arbitrary location having a fixed positional relationship with an antenna inside the work vehicle 1 or in the surroundings of the work vehicle 1.

The IMU 33 is an inertial measurement device. The IMU 33 obtains vehicle body inclination angle data. The vehicle body inclination angle data includes the angle (pitch angle) relative to horizontal in the vehicle front-back direction and the angle (roll angle) relative to horizontal in the vehicle lateral direction. The controller 26 obtains the vehicle body inclination angle data from the IMU 33.

The controller 26 computes a blade tip position Pb from the lift cylinder length Llift, the vehicle body position data, and vehicle body inclination angle data. As illustrated in FIG. 3, the controller 26 calculates global coordinates of the GNSS receiver 32 based on the vehicle body position data. The controller 26 calculates the lift angle θlift based on the lift cylinder length Llift. The controller 26 calculates local coordinates of the blade tip position Pb with respect to the GNSS receiver 32 based on the lift angle θlift and vehicle body dimension data.

The vehicle body dimension data is stored in the storage device 28 and indicates the position of the work implement 13 with respect to the GNSS receiver 32. The controller 26 calculates the global coordinates of the blade tip position Pb based on the global coordinates of the GNSS receiver 32, the local coordinates of the blade tip position Pb, and the vehicle body inclination angle data. The controller 26 obtains the global coordinates of the blade tip position Pb as blade tip position data.

In addition, the controller 26 calculates the tilt angle in the global coordinate system from the tilt angle θtilt in the aforementioned local coordinate system, the vehicle body position data, and the vehicle body inclination angle data. The global coordinate system may be a world-wide coordinate system or may be coordinate system based on the work site. The local coordinate system is a coordinate system based on the work vehicle 1.

The storage device 28 includes, for example, a memory and an auxiliary storage device. The storage device 28 may be a RAM or a ROM, for example. The storage device 28 may be a semiconductor memory or a hard disk and the like. The storage device 28 is an example of a non-transitory computer-readable recording medium. The storage device 28 records computer commands for controlling the work vehicle 1 and that are executable by the processor.

The storage device 28 stores design topography data and work site topography data. The design topography data indicates the final design topography. The final design topography is a final target shape of the surface of the work site. The work site topography data is, for example, a civil engineering diagram map in a three-dimensional data format. The work site topography data indicates the topography of a wide area of the work site. The work site topography data is, for example, an actual topographical survey map in a three-dimensional data format. The work site topography data can be derived, for example, from an aerial laser survey.

The controller 26 obtains actual topography data. The actual topography data represents the actual topography of the work site. The actual topography of the work site is the topography of an area in the traveling direction of the work vehicle 1. The actual topography data is obtained by computing by the controller 26 from the work site topography data and the position and the traveling direction of the work vehicle 1 obtained by the abovementioned positional sensor 31. The actual topography data may be obtained by carrying out distance surveying on the actual topography with an on-board laser imaging detection and ranging device (LIDAR).

The controller 26 automatically controls the work implement 13 based on the actual topography data, the design topography data, and the blade tip position data. The automatic control of the work implement 13 may be a semi-automatic control that is performed in accompaniment to manual operations by the operator. Alternatively, the automatic control of the work implement 13 may be a fully automatic control that is performed without manual operations by an operator. The traveling of the work vehicle 1 may be controlled automatically by the controller 26. For example, the travel control of the work vehicle 1 may be a fully automatic control that is performed without manual operations by an operator. Alternatively, the travel control may be a semi-automatic control that is performed in accompaniment with manual operations by an operator. Alternatively, the travel of the work vehicle 1 may be performed with manual operations by the operator.

Automatic control of the work vehicle 1 during excavation and executed by the controller 26 will be explained below. The controller 26 starts the automatic control when a predetermined starting condition is met. The predetermined starting condition may be, for example, the reception of an operation signal which indicates a lowering operation of the work implement 13 from the operating device 25a. Alternatively, the predetermined starting condition may be the reception of an operation signal indicating an automatic control starting command by the controller 26 from the input device 25b.

Figure 5:
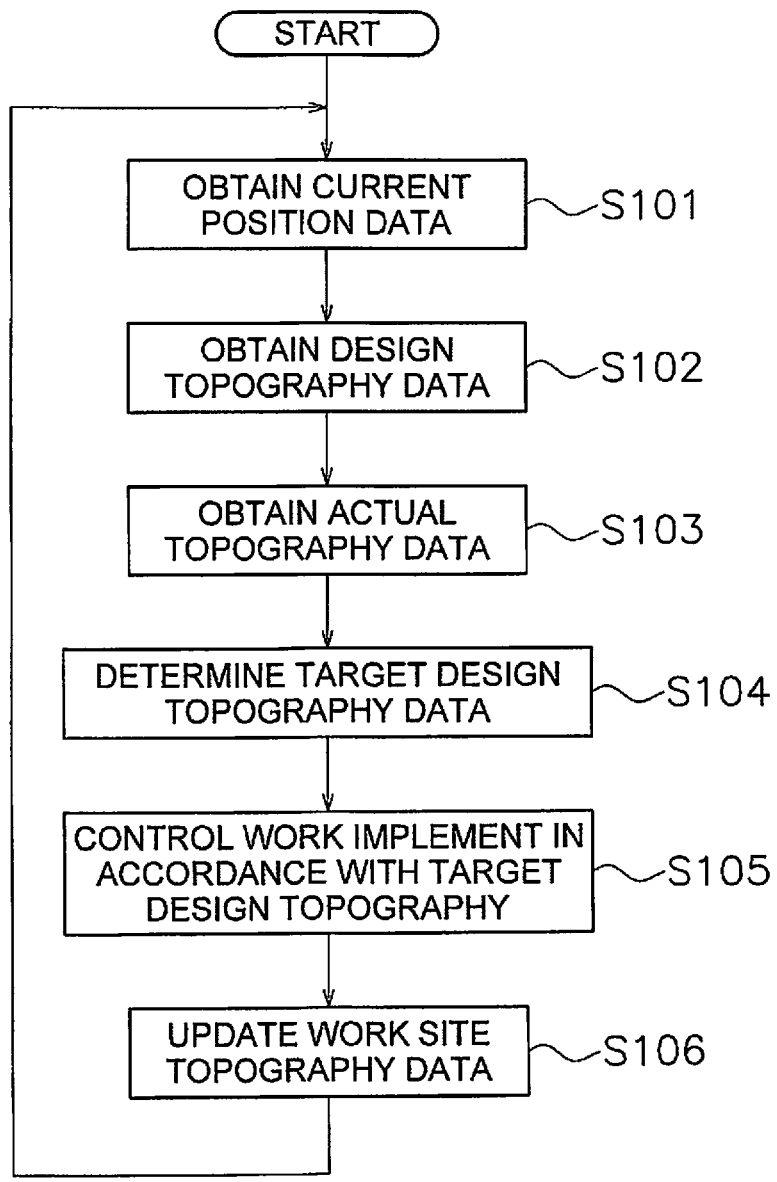
FIG. 5 is a flow chart of an automatic control process of the work vehicle.

FIG. 5 is a flow chart of an automatic control process of the work vehicle 1. As illustrated in FIG. 5, the controller 26 obtains the current position data in step S101. The controller 26 obtains the current blade tip position Pb of the blade 18 as indicated above.

Figure 6:
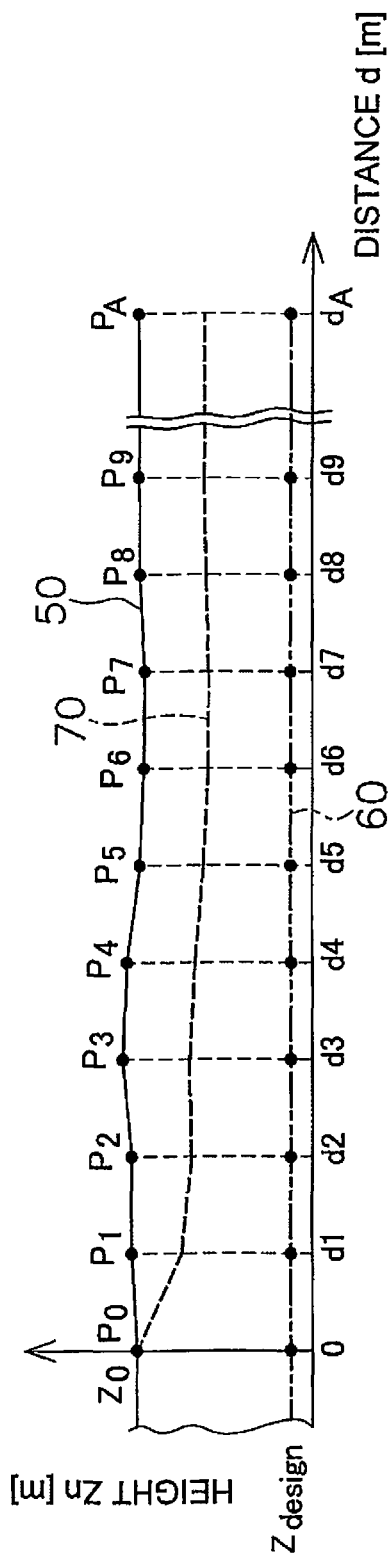
FIG. 6 illustrates examples of a final design topography, an actual topography, and a target design topography.

In step S102, the controller 31 obtains the design topography data. As illustrated in FIG. 6, the design topography data includes a height Zdesign of a final design topography 60 at a plurality of reference points Pn (n=0, 1, 2, 3, ..., A) in the traveling direction of the work vehicle 1. The plurality of reference points Pn represent a plurality of spots at predetermined intervals in the traveling direction of the work vehicle 1. The plurality of reference points Pn are on the travel path of the blade 18. In FIG. 6, while the final design topography 60 has a shape that is flat and parallel to the horizontal direction, the shape of the final design topography 60 may be different.

In step S103, the controller 26 obtains the actual topography data. The controller 26 obtains the actual topography data by computing from the work site topography data obtained from the storage device 28 and the vehicle body position data and the traveling direction data obtained by the positional sensor 31.

The actual topography data is information indicative of the topography located in the traveling direction of the work vehicle 1. FIG. 6 illustrates a cross-section of actual topography 50. In FIG. 6, the vertical axis represents the height of the topography and the horizontal axis represents the distance from the current position in the traveling direction of the work vehicle 1.

Specifically, the actual topography data includes a height Zn of the actual topography 50 at each of the plurality of reference points Pn from the current position to a predetermined topography recognition distance dA in the traveling direction of the work vehicle 1. In the present embodiment, the current position may be a position defined based on the current blade tip position Pb of the work vehicle 1. However, the current position may also be defined based on the current position of another portion of the work vehicle 1. The plurality of reference points are aligned with a predetermined interval, for example 1 m, between each point.

In step S104, the controller 26 determines target design topography data. The target design topography data represents a target design topography 70 indicated by the dashed line in FIG. 6. The target design topography 70 represents a desired locus of the blade tip of the blade 18 during the work. The target design topography 70 is a target profile of the topography that is the work object and represents the desired shape as a result of the excavating work. As illustrated in FIG. 6, the controller 26 determines at least a portion of the target design topography 70 located below the actual topography 50.

The controller 26 determines the target design topography 70 so as not to go below the final design topography 60. Therefore, the controller 26 determines the target design topography 70 located above the final design topography 60 and below the actual topography 50 during the excavating work.

In step S105, the controller 26 controls the work implement 13 in accordance with the target design topography 70. The controller 26 generates command signals for the work implement 13 so as to move the blade tip position Pb of the blade 18 in accordance with the target design topography 70. The generated command signal is inputted to the control valve 27. Consequently, the blade tip position Pb of the blade 18 moves toward the target design topography 70.

In step S106, the controller 26 updates the work site topography data. The controller 26 updates the work site topography data with the position data that represents the most recent locus of the blade tip position Pb. The update of the work site topography data may be performed at any time. Alternatively, the controller 26 may calculate the location of the bottom surface of the crawler belts 16 from the vehicle body position data and the vehicle body dimension data, and may update the work site topography data with the position data that represents the locus of the bottom surface of the crawler belts 16. In this case, the updating of the work site topography data can be performed promptly.

Alternatively, the work site topography data may be generated from survey data measured by a survey device outside of the work vehicle 1. For example, aerial laser surveying may be used as the external measurement device. Alternatively, the actual topography 50 may be imaged by a camera and the work site topography data may be generated from image data captured by the camera. For example, aerial photography surveying performed with an unmanned aerial vehicle (UAV) may be used. When using the external surveying device or a camera, the updating of the work site topography data may be performed at predetermined periods or at any time.

By repeating the above processes, the excavating is performed so that the actual topography 50 approaches the final design topography 60.

Figure 7:
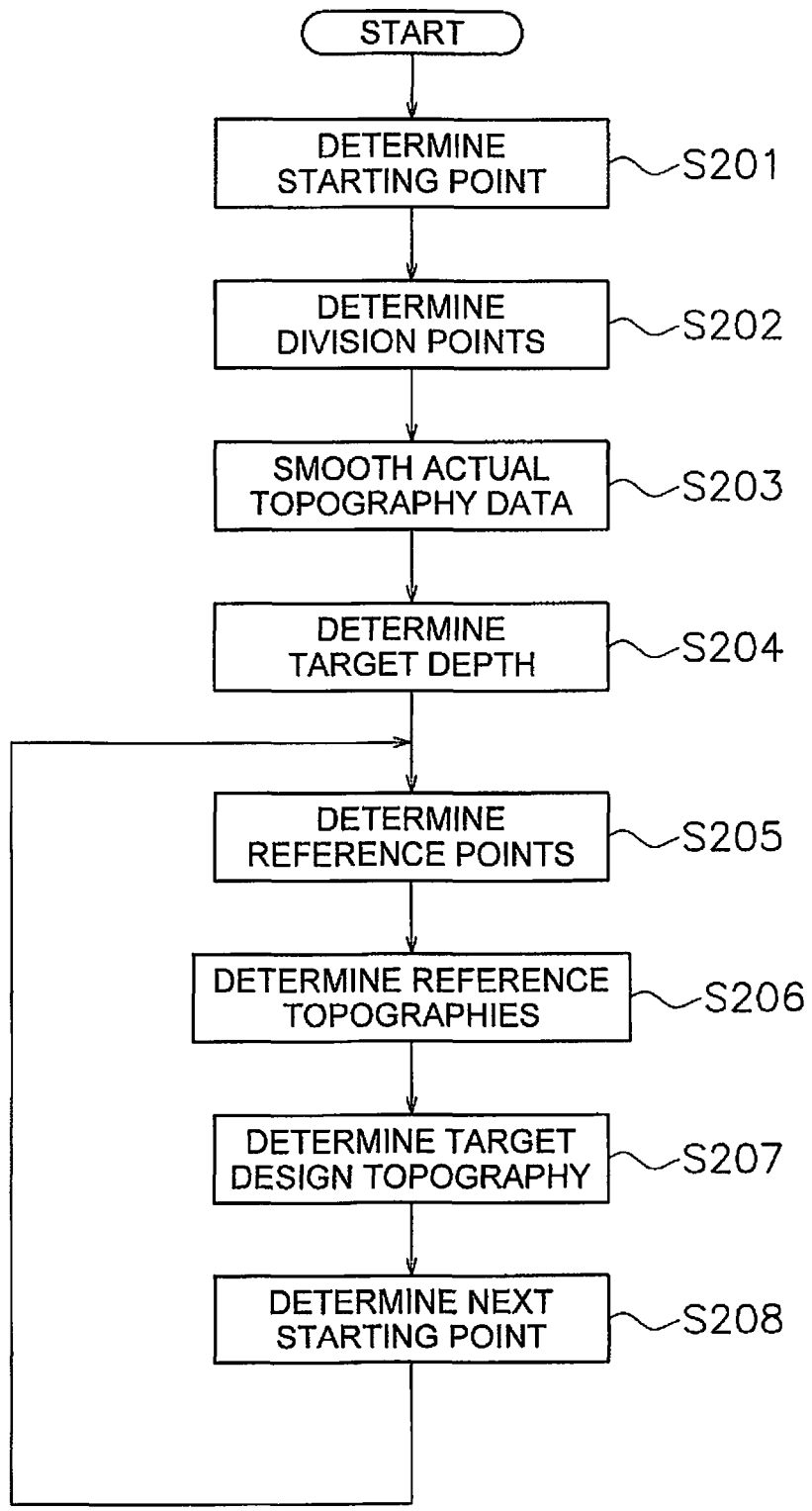
FIG. 7 is a flow chart of a process for determining the target design topography.
Figure 8:
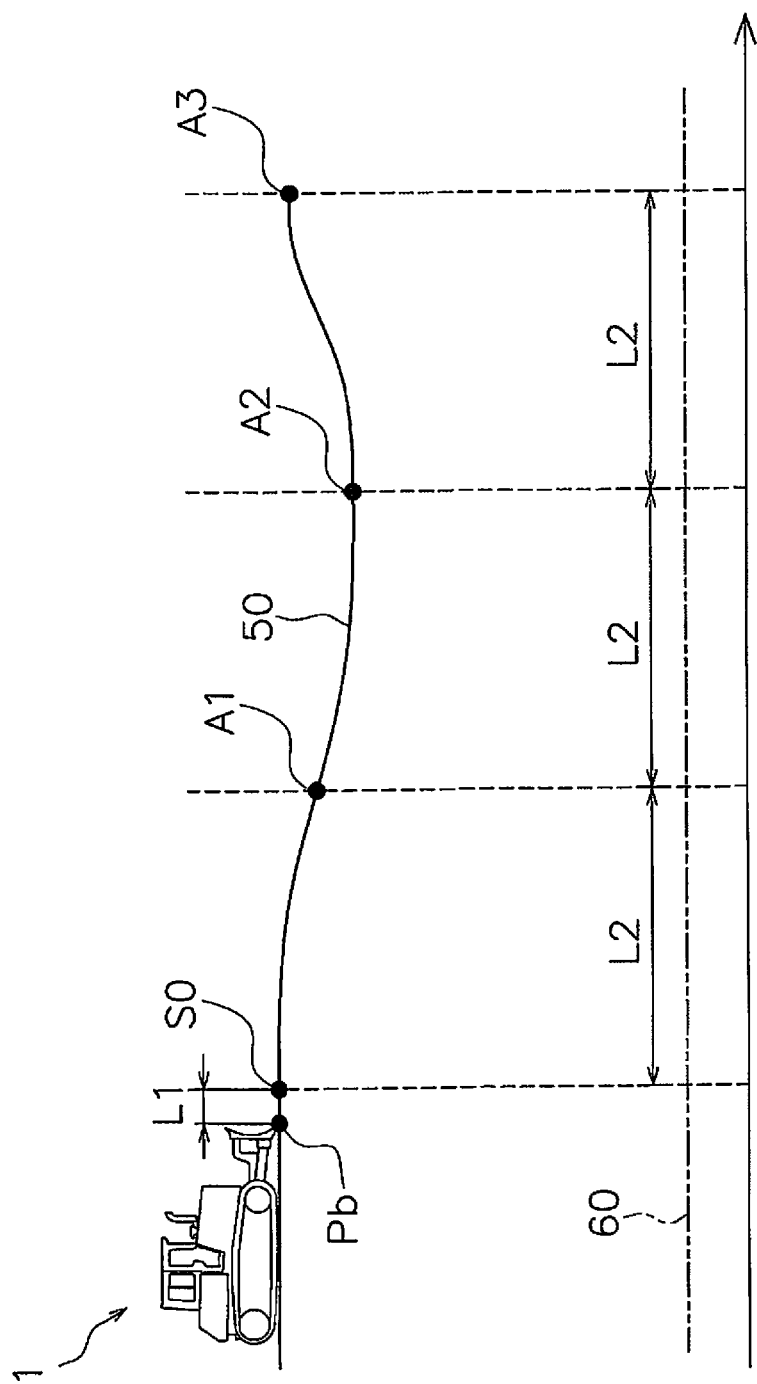
FIG. 8 illustrates a process for determining the target design topography.

The processing for determining the target design topography 70 is explained in detail below. FIG. 7 is a flow chart of a process for determining the target design topography 70. As illustrated in FIG. 7, in step S201, the controller 26 determines a starting point S0. As illustrated in FIG. 8, the controller 26 determines, as the starting point S0, a position that is a predetermined distance L1 in front of the blade tip position Pb at the point in time that the automatic control starts. The predetermined distance L1 is saved in the storage device 28. The input device 25b may be used to allow setting of the predetermined distance L1.

In step S202, the controller 26 determines a plurality of division points An (n=1, 2, ... ) based on the actual topography data. As illustrated in FIG. 8, the controller 26 demarcates the actual topography 50 into a plurality of divisions according to the division points An. The division points An are spots positioned away from each other by a predetermined interval L2 on the actual topography 50. The predetermined interval L2 is, for example, 3 m. However, the predetermined interval L2 may be less than 3 m or greater than 3 m. The predetermined interval L2 is saved in the storage device 28. The input device 25b may be used to allow setting of the predetermined interval L2. The controller 26 determines, as the division points An, a plurality of spots at each predetermined interval L2 in the traveling direction of the work vehicle 1 from the starting point S0.

Figure 9:
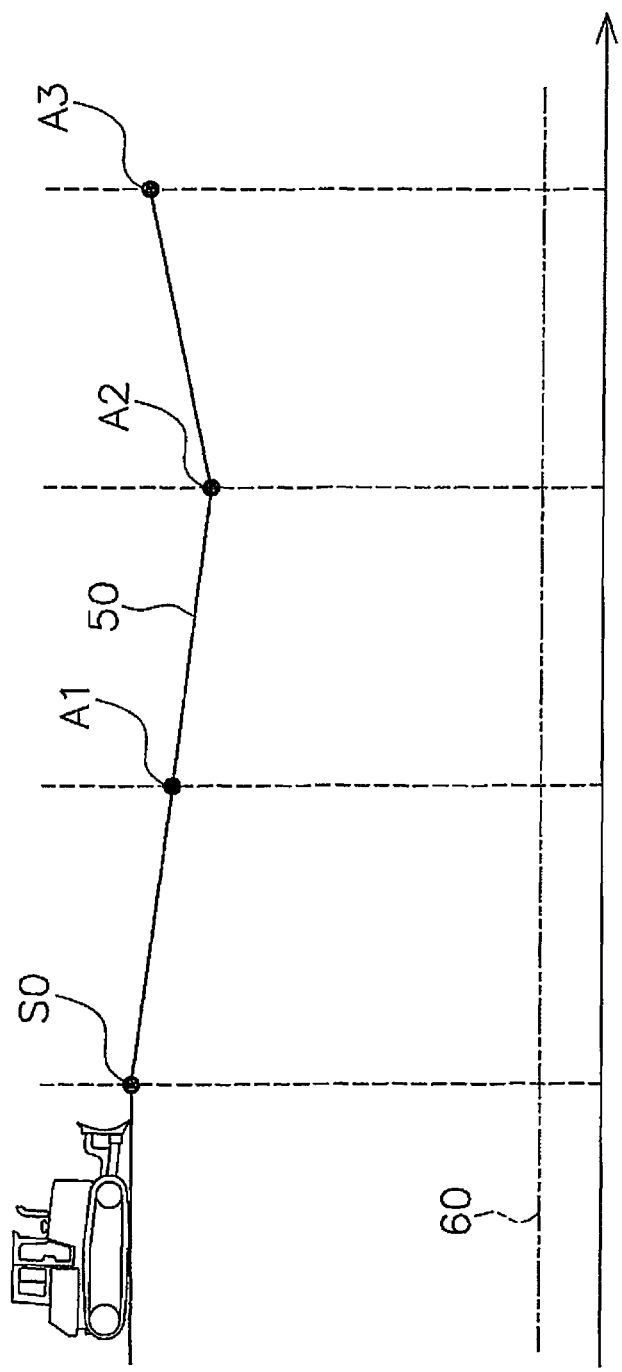
FIG. 9 illustrates a process for determining the target design topography.

In step S203, the controller 26 smooths the actual topography data. The controller 26 smooths the actual topography data by linear interpolation. Specifically, as illustrated in FIG. 9, the controller 26 smooths the actual topography data by replacing the actual topography 50 with straight lines that link each of the division points An.

In step S204, the controller 26 determines a target depth L3. The controller 26 determines the target depth L3 in accordance with a control mode set with the input device 25b. For example, the operator is able to select any of a first mode, a second mode, and a third mode with the input device 25b. The first mode is a control mode with the greatest load and the third mode is a control mode with the smallest load. The second mode is a control mode with a load between the first mode and the third mode.

The target depths L3 corresponding to each mode are saved in the storage device 28. The controller 26 selects, as the target depth L3, a first target depth of the first mode, a second target depth of the second mode, or a third target depth of the third mode. The first target depth is greater than the second target depth. The second target depth is greater than the third target depth. The input device 25b may be used to allow setting of the target depth L3.

Figure 10:
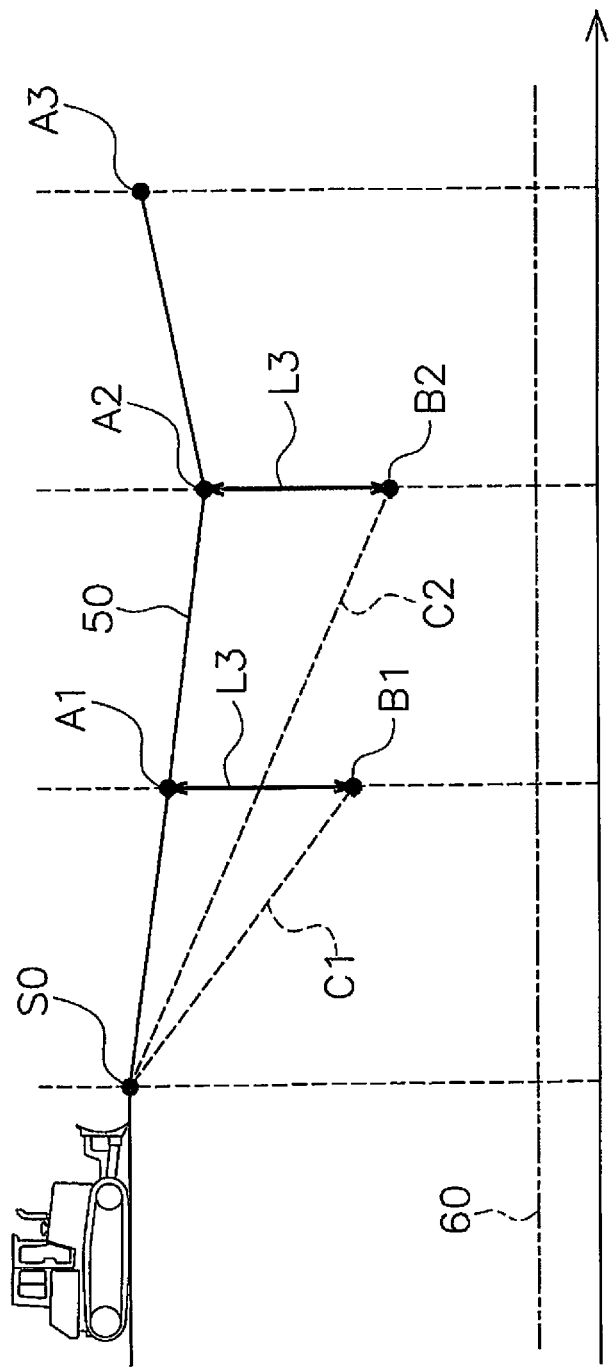
FIG. 10 illustrates a process for determining the target design topography.

In step S205, the controller 26 determines a plurality of reference points. As illustrated in FIG. 10, the controller 26 determines, as respective reference points B1 and B2, spots displaced downward by the target depth L3 from the first preceding division point A1 and from the second preceding division point A2.

In step S206, the controller 26 determines a plurality of reference topographies. As illustrated in FIG. 10, the controller 26 determines a first reference topography C1 and a second reference topography C2. The first reference topography C1 is represented by a straight line that links the starting point S0 and the first preceding reference point B1. The second reference topography C2 is represented by a straight line that links the starting point S0 and the second preceding reference point B2.

Figure 11:
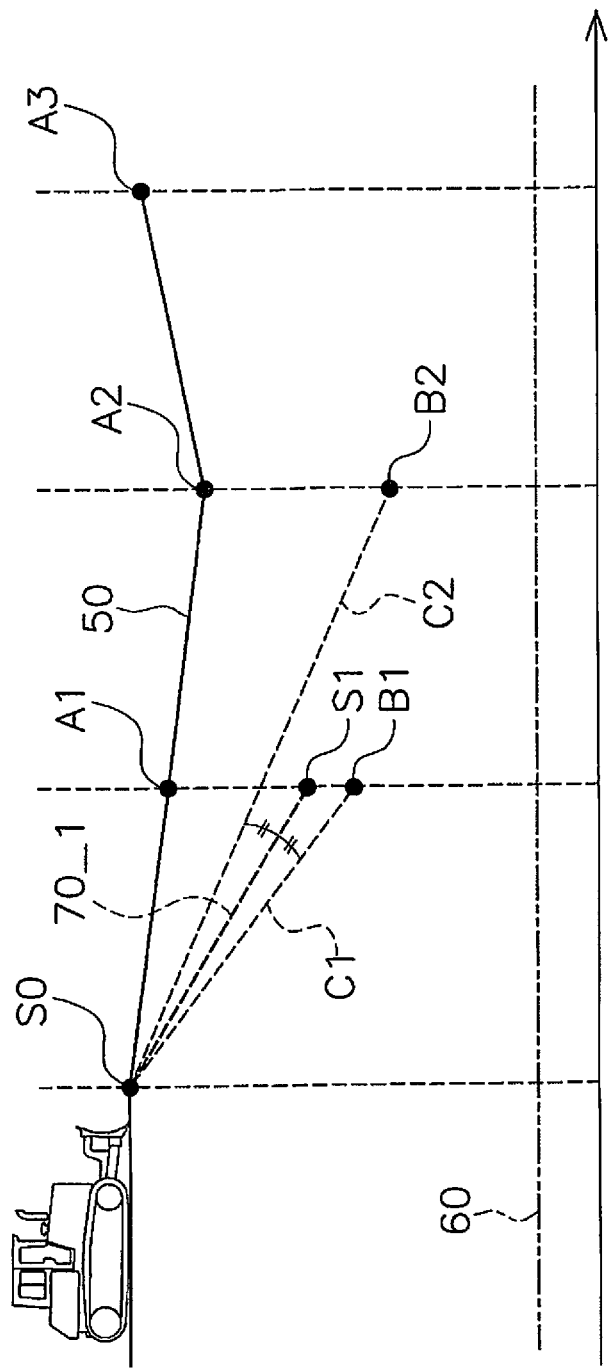
FIG. 11 illustrates a process for determining the target design topography.

In step S207, the controller 26 determines the target design topography 70. The controller 26 determines the target design topography 70 for each division demarcated by the plurality of division points An. As illustrated in FIG. 11, the controller 26 determines a first target design topography 70_1 so as to pass through the first reference topography C1 and the second reference topography C2. The first target design topography 70_1 is the target design topography 70 in the division between the starting point S0 and the first preceding division point A1.

Specifically, the controller 26 calculates the average angle of the first reference topography C1 and the second reference topography C2. The average angle is the average value between the angle of the first reference topography C1 with respect to the horizontal direction and the angle of the second reference topography C2 with respect to the horizontal direction The controller 26 determines, as the first target design topography 70_1, a straight line that is inclined by the average angle with respect to the horizontal direction.

Figure 12:
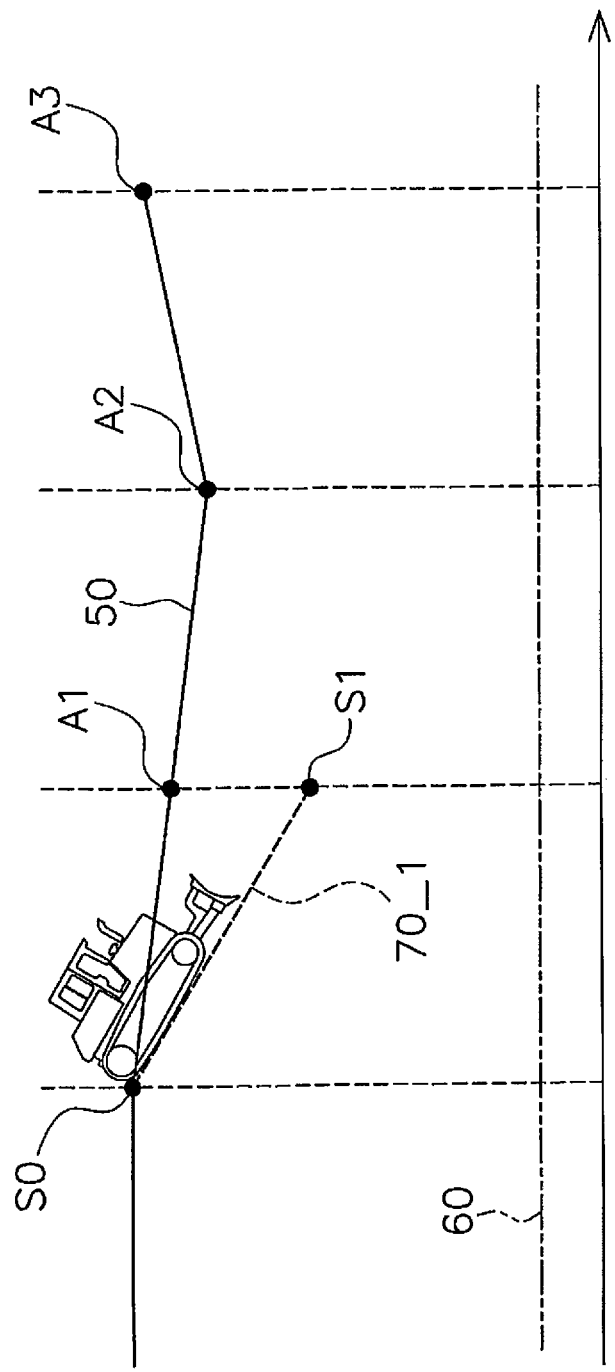
FIG. 12 illustrates a process for determining the target design topography.

When the first target design topography 70_1 is determined as indicated above, in accordance with the abovementioned process of step S105, the controller 26 controls the work implement 13 in accordance with the first target design topography 70_1 as illustrated in FIG. 12.

Figure 13:
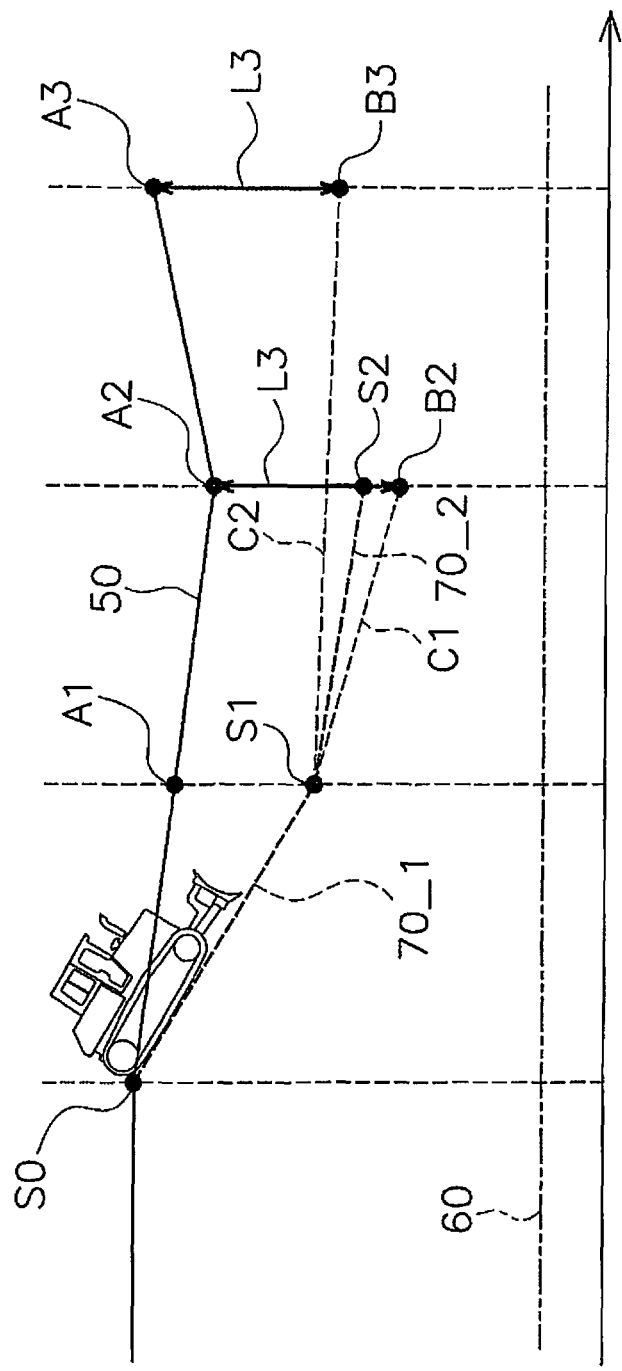
FIG. 13 illustrates a process for determining the target design topography.

In step S208, the controller 26 determines the next starting point S1. The next starting point S1 is the starting point of the next target design topography 70, namely a second target design topography 70_2. The second target design topography 70_2 is the target design topography 70 in the division between the next starting point S1 and the first preceding division point A2 from the starting point S1. As illustrated in FIG. 13, the next starting point S1 is the end position of the first target design topography 70_1 and is positioned directly below the division point A1.

Upon determining the next starting point S1, the controller 26 determines the second target design topography 70_2 by repeating the processes from step S205 to step S207. The controller 26 determines the second target design topography 70_2 while working according to the first target design topography 70_1.

Specifically, as illustrated in FIG. 13, the controller 26 determines, as the next first reference topography C1, a straight line that links the next starting point S1 and the first preceding reference point B2 from the starting point S1. The controller 26 also determines, as the next second reference topography C2, a straight line that links the next starting point S1 and the second preceding reference point B3 from the starting point S1. The controller 26 determines the second target design topography 70_2 from the average angle of the first reference topography C1 and the second reference topography C2.

When the work vehicle 1 reaches the next starting point S1, in accordance with the abovementioned process of step S105, the controller 26 controls the work implement 13 in accordance with the second target design topography 70_2. The controller 26 then continues the excavation of the actual topography 50 by repeating the above processes.

When a predetermined completion condition is satisfied, the controller 26 finishes the abovementioned processes for determining the target design topography 70. The predetermined completion condition is, for example, that the amount of material held by the work implement 13 has reached a predetermined upper limit. When the predetermined completion condition is satisfied, the controller 26 controls the work implement 13 so as to follow the actual topography 50. Consequently, the excavated material can be smoothly transported.

Figure 14:
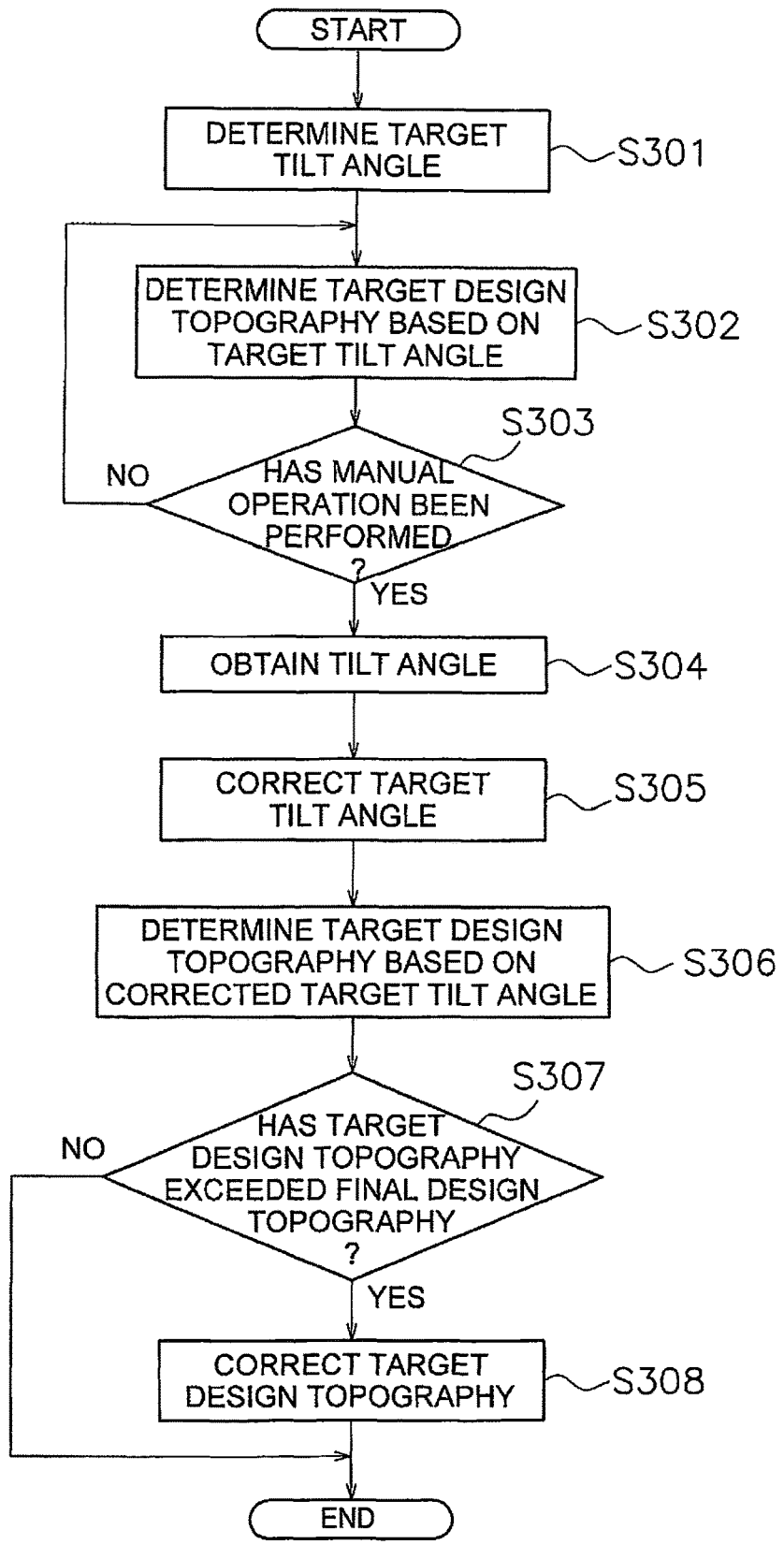
FIG. 14 is a flow chart of a process when a manual operation is introduced.
Figure 15:
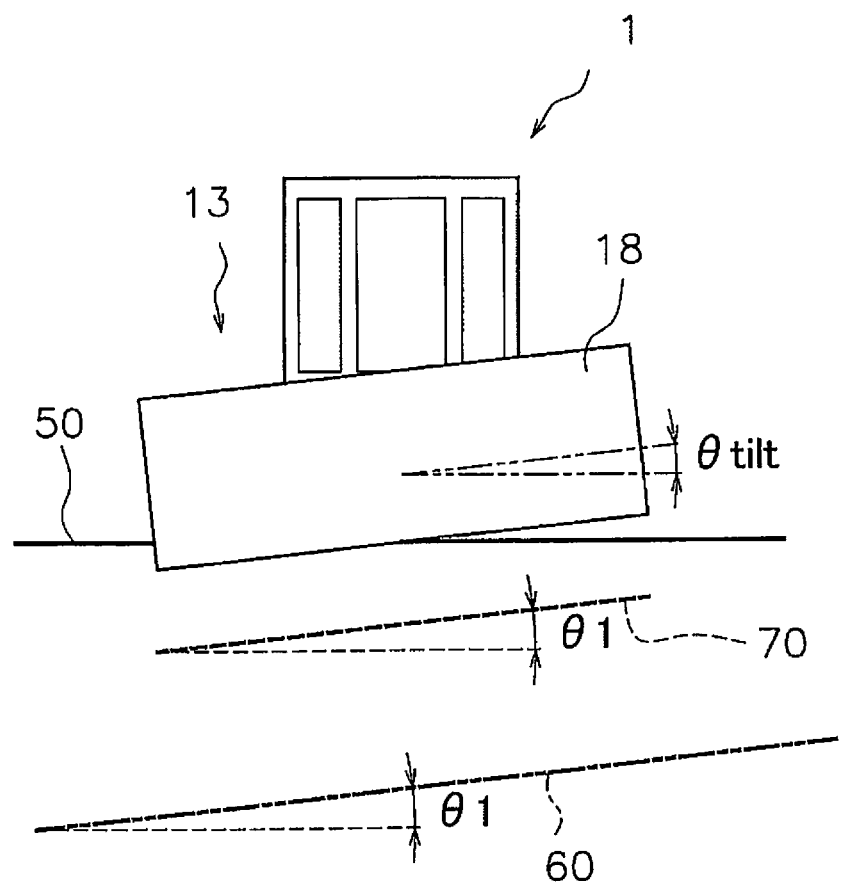
FIG. 15 illustrates a process for determining an initial value of a target tilt angle.

The process when a manual operation of the work implement 13 is introduced by the operator during the abovementioned automatic control is explained next. FIG. 14 is a flow chart of a process when a manual operation is introduced. FIG. 15 is a front view of the work vehicle 1, the final design topography 60, the actual topography 50, and the target design topography 70. The size of the target design topography 70 in the vehicle width direction may be determined based on the dimensions of the work implement 13 in the vehicle width direction. Alternatively, the size of the target design topography 70 may be set with the input device 25b.

The controller 26 determines a target tilt angle in step S301. The controller 26 determines an initial value of the target tilt angle in accordance with the final design topography 60. Specifically, as illustrated in FIG. 15, the controller 26 determines the initial value of the target tilt angle so that the blade 18 is parallel to the final design topography 60. When starting the automatic control, the controller 26 determines the aforementioned initial value as the target tilt angle. For example, as illustrated in FIG. 15, when the final design topography 60 in the vehicle width direction is inclined at the angle θ1 with respect to the horizontal direction, the controller 26 determines the target tilt angle so that the tilt angle θtilt of the blade 18 with respect to the horizontal direction is θ1.

In step S302, the controller 26 determines the target design topography 70 based on the target tilt angle determined in step S301. When the target tilt angle is set to the initial value, the controller 26 determines the target design topography 70 so as to be parallel to the final design topography 60 in the vehicle width direction as illustrated in FIG. 15. The controller 26 determines the target design topography 70 so as to match the final design topography 60 even if the actual topography 50 is inclined with respect to the final design topography 60. As illustrated in FIG. 15, when the final design topography 60 in the vehicle width direction is inclined with respect to the horizontal direction by the angle θ1, the controller 26 determines the target design topography 70 that is inclined by the angle θ1 with respect to the horizontal direction in the vehicle width direction. The shape of the target design topography 70 in the traveling direction of the work vehicle 1 is determined by the aforementioned processes from step S201 to step S208.

When the target design topography 70 is determined as indicated above, in accordance with the abovementioned process of step S105, the controller 26 controls the blade 18 in accordance with the target design topography 70. As illustrated in FIG. 15, the controller 26 controls the blade 18 in accordance with the target design topography 70 while maintaining the tilt angle θtilt of the blade 18 at the target tilt angle. For example, as illustrated in FIG. 15, the controller 26 controls the blade 18 in accordance with the first target design topography 70_1 illustrated in FIG. 12 while maintaining the tilt angle θtilt of the blade 18 at the target tilt angle.

In step S303, the controller 26 determines whether a manual operation has been performed. The controller 26 determines that a manual operation has been performed when an operation signal which indicates an operation for causing the work implement 13 to perform a tilting motion is received from the operating device 25a. The process advances to S304 when the manual operation is performed.

In step S304, the controller 26 obtains the tilt angle θtilt changed due to the manual operation. The controller 26 may also obtain the changed tilt angle θtilt with a detection signal from the tilt sensor 30. Alternatively, the controller 26 may also obtain the changed tilt angle θtilt with an operation signal from the operating device 25a.

In step S305, the controller 26 corrects the target tilt angle. The controller 26 corrects the target tilt angle in accordance with the changed tilt angle θtilt. The controller 26 corrects the target tilt angle so as to match the changed tilt angle θtilt.

Figure 16:
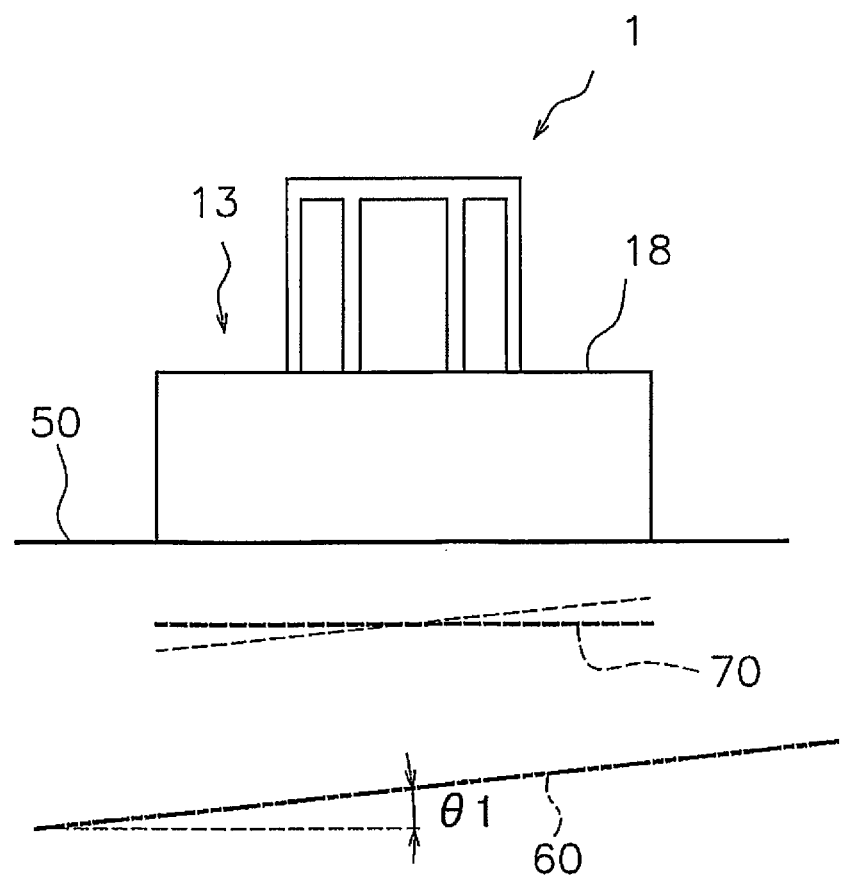
FIG. 16 illustrates a process for determining a changed target tilt angle.

In step S306, the controller 26 determines the target design topography 70 at the corrected target tilt angle. As illustrated in FIG. 16, the controller 26 determines the target design topography 70 so as to be parallel to the blade 18 in the vehicle width direction.

Figure 17:
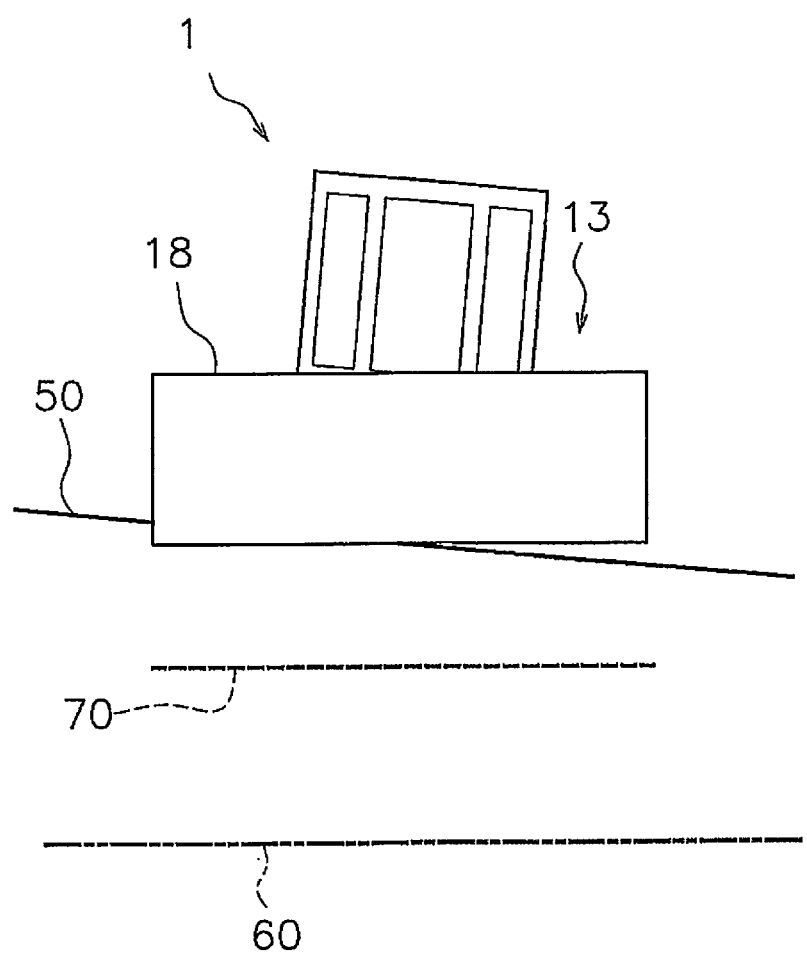
FIG. 17 illustrates a process for determining an initial value of a target tilt angle.
Figure 18:
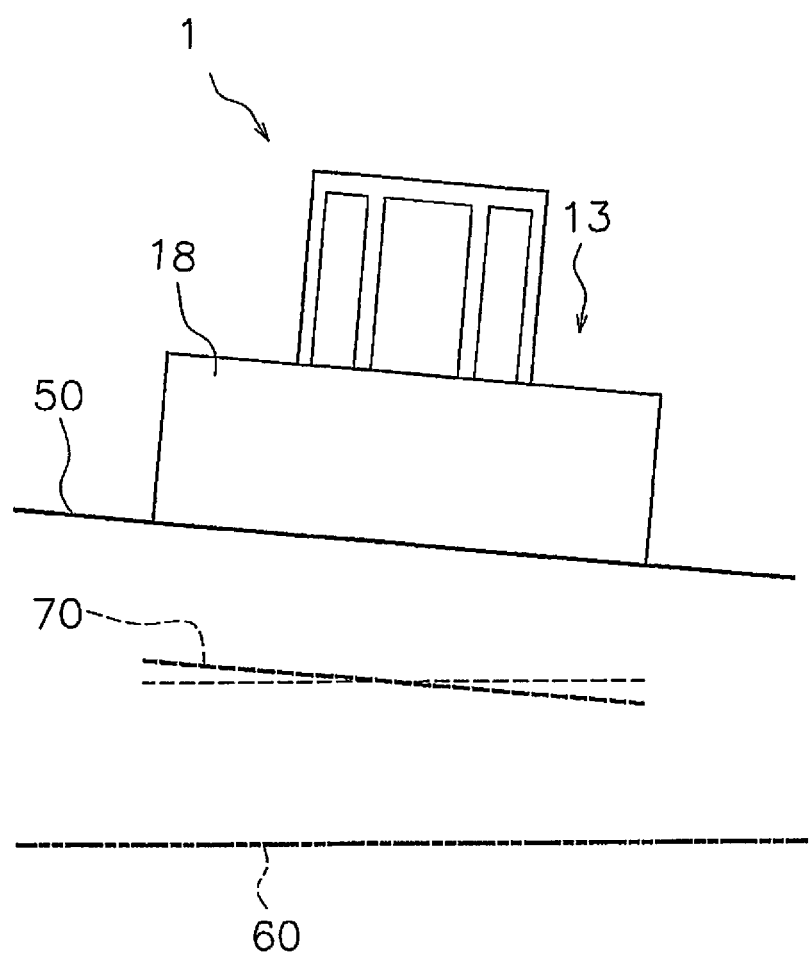
FIG. 18 illustrates a process for determining a changed target tilt angle.

In the examples in FIGS. 15 and 16, the final design topography 60 in the vehicle width direction is inclined at the angle θ1 with respect to the horizontal direction. However, as illustrated in FIG. 17, when the final design topography 60 in the vehicle width direction is horizontal, the controller 26 determines the target tilt angle so that the blade 18 is horizontal in step S301, and determines the target design topography 70 so as to be horizontal in the vehicle width direction in step S302. As illustrated in FIG. 18, when the tilt angle θtilt is changed due to a manual operation, the controller 26 corrects the target tilt angle so as to match the changed tilt angle θtilt in step S305, and determines the target design topography 70 so as to be parallel to the blade 18 in the vehicle width direction in step S306.

In step S307, the controller 26 determines whether the target design topography 70 has exceeded the final design topography 60. When the controller 26 determines that at least a portion of the target design topography 70 has exceeded the final design topography 60, the process advances to step S308.

Figure 19:
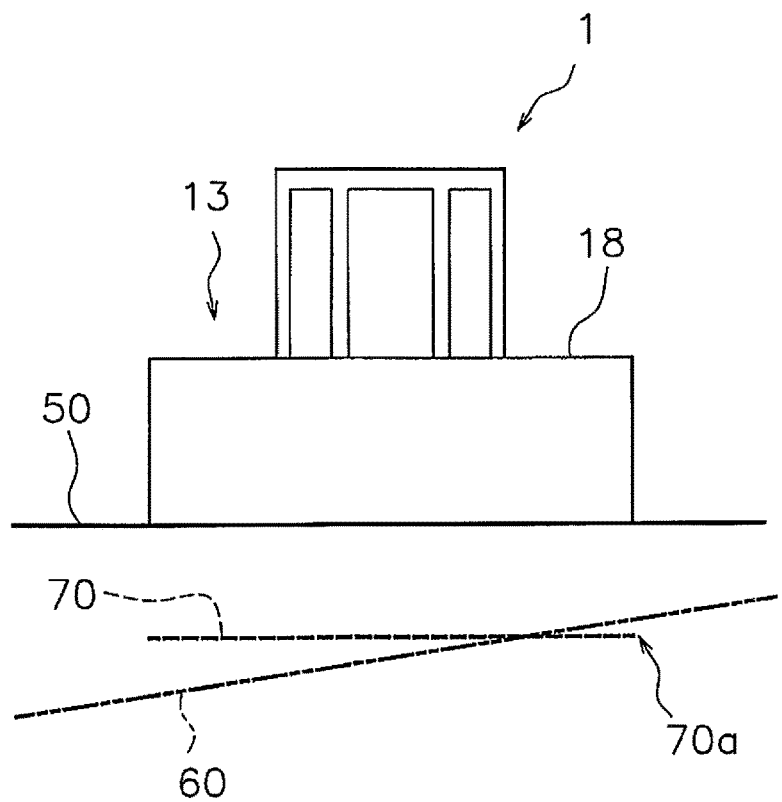
FIG. 19 illustrates a process for correcting the target design topography.
Figure 20:
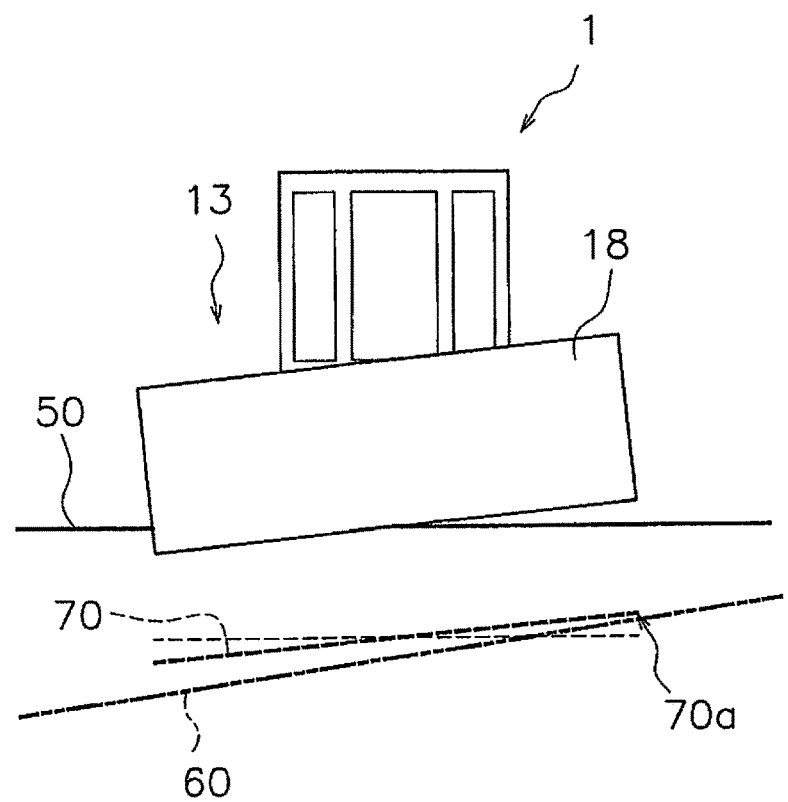
FIG. 20 illustrates a process for correcting the target design topography.
Figure 21:
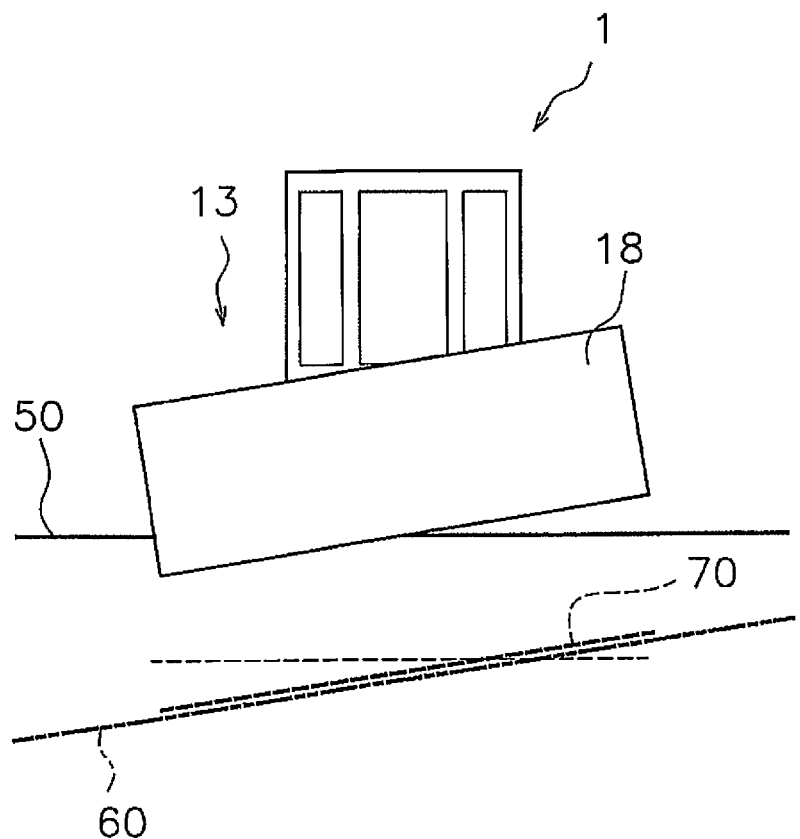
FIG. 21 illustrates a process for correcting the target design topography.

In step S308, the controller 26 corrects the target design topography 70 so that the target design topography 70 does not exceed the final design topography 60. For example, as illustrated in FIG. 19, when a lateral end 70a of the target design topography 70 exceeds the final design topography 60 in the downward direction, the controller 26 corrects the target tilt angle so that the lateral end 70a of the target design topography 70 is equal to or greater than the height of the final design topography 60 as illustrated in FIG. 20. Alternatively, as illustrated in FIG. 21, the controller 26 may correct the target tilt angle so that the target design topography 70 becomes parallel to the final design topography 60.

As described above, when the tilt angle θtilt of the blade 18 is changed due to a manual operation by the operator, the controller 26 determines the target design topography 70 so as to match the changed tilt angle θtilt. However, when at least a portion of the target design topography 70 exceeds the final design topography 60, the target tilt angle is corrected so that the target design topography does not exceed the final design topography 60. That is, when at least a portion of the target design topography 70 exceeds the final design topography 60, the controller 26 prioritizes correcting the target tilt angle so that the target design topography does not exceed the final design topography 60 over correcting the target tilt angle in accordance with the operation of the operating device 25a.

In the control system 3 of the work vehicle 1 according to the present embodiment explained above, the controller 26 operates the work implement 13 in accordance with the target design topography 70. As a result, when the final design topography 60 is still in a deep position, excavating by the work implement 13 is performed in accordance with the target design topography 70 that is positioned above the final design topography 60. As a result, a situation in which the load on the work implement 13 becomes excessive is suppressed. In addition, the sudden raising or lowering of the work implement 13 is suppressed. Accordingly, the work vehicle 1 can be made to perform work efficiently and with a good finish quality.

When a manual operation of the work implement 13 is introduced by the operator during the automatic control, the controller 26 corrects the target tilt angle in response to the changed tilt angle θtilt and determines the target design topography 70 in accordance with the corrected target tilt angle. As a result, the intention of the operator can be reflected in the automatic control.

Although an embodiment of the present invention has been described so far, the present invention is not limited to the above embodiment and various modifications may be made within the scope of the invention.

The work vehicle 1 is not limited to a bulldozer, and may be another type of work vehicle such as a wheel loader, a motor grader, a hydraulic excavator, or the like.

The work vehicle 1 may be a vehicle that can be remotely operated. In this case, a portion of the control system 3 may be disposed outside of the work vehicle 1. For example, the controller 26 may be disposed outside the work vehicle 1. The controller may be disposed inside a control center spaced away from the work site. In this case, the work vehicle 1 may not be provided with the operating cabin 14.

The work vehicle 1 may be driven by an electric motor. In this case, the power source may be disposed outside of the work vehicle 1. The work vehicle 1 in which the power source is supplied from the outside may not be provided with the internal combustion engine or the engine compartment.

Figure 22:
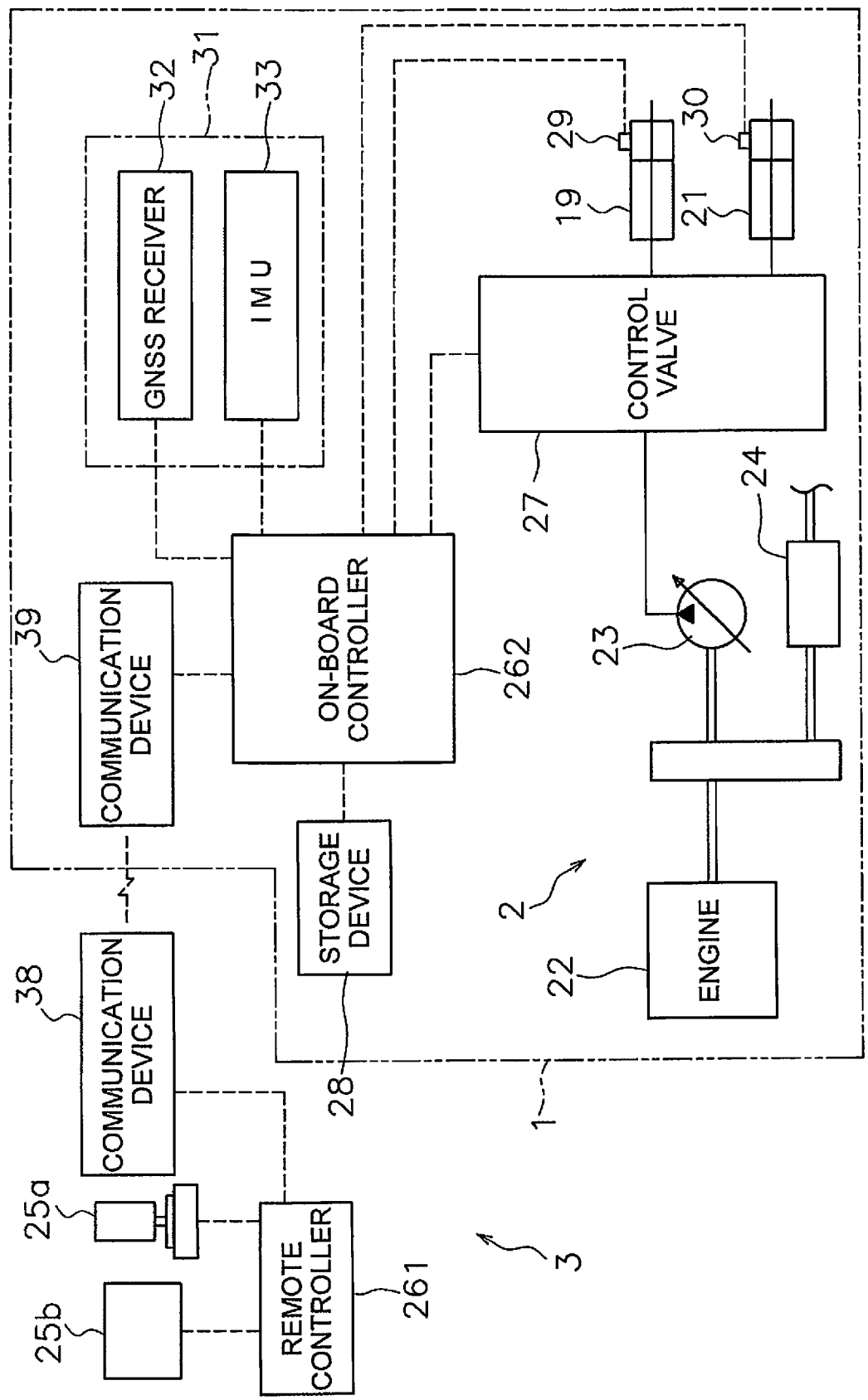
FIG. 22 is a block diagram of a configuration of a drive system and a control system of the work vehicle according to a first modified example.

The controller 26 may have a plurality of controllers 26 separate from each other. For example, as illustrated in FIG. 22, the controller 26 may include a remote controller 261 disposed outside of the work vehicle 1 and an on-board controller 262 mounted in the work vehicle 1. The remote controller 261 and the on-board controller 262 may be able to communicate wirelessly via communication devices 38 and 39. A portion of the abovementioned functions of the controller 26 may be executed by the remote controller 261, and the remaining functions may be executed by the on-board controller 262. For example, the processes for determining the target design topography 70 may be performed by the remote controller 261, and the processes for outputting the command signals to the work implement 13 may be performed by the on-board controller 262.

The operating device 25a and the input device 25b may also be disposed outside of the work vehicle 1. In this case, the operating cabin may be omitted from the work vehicle 1. Alternatively, the operating device 25a and the input device 25b may be omitted from the work vehicle 1.

Figure 23:
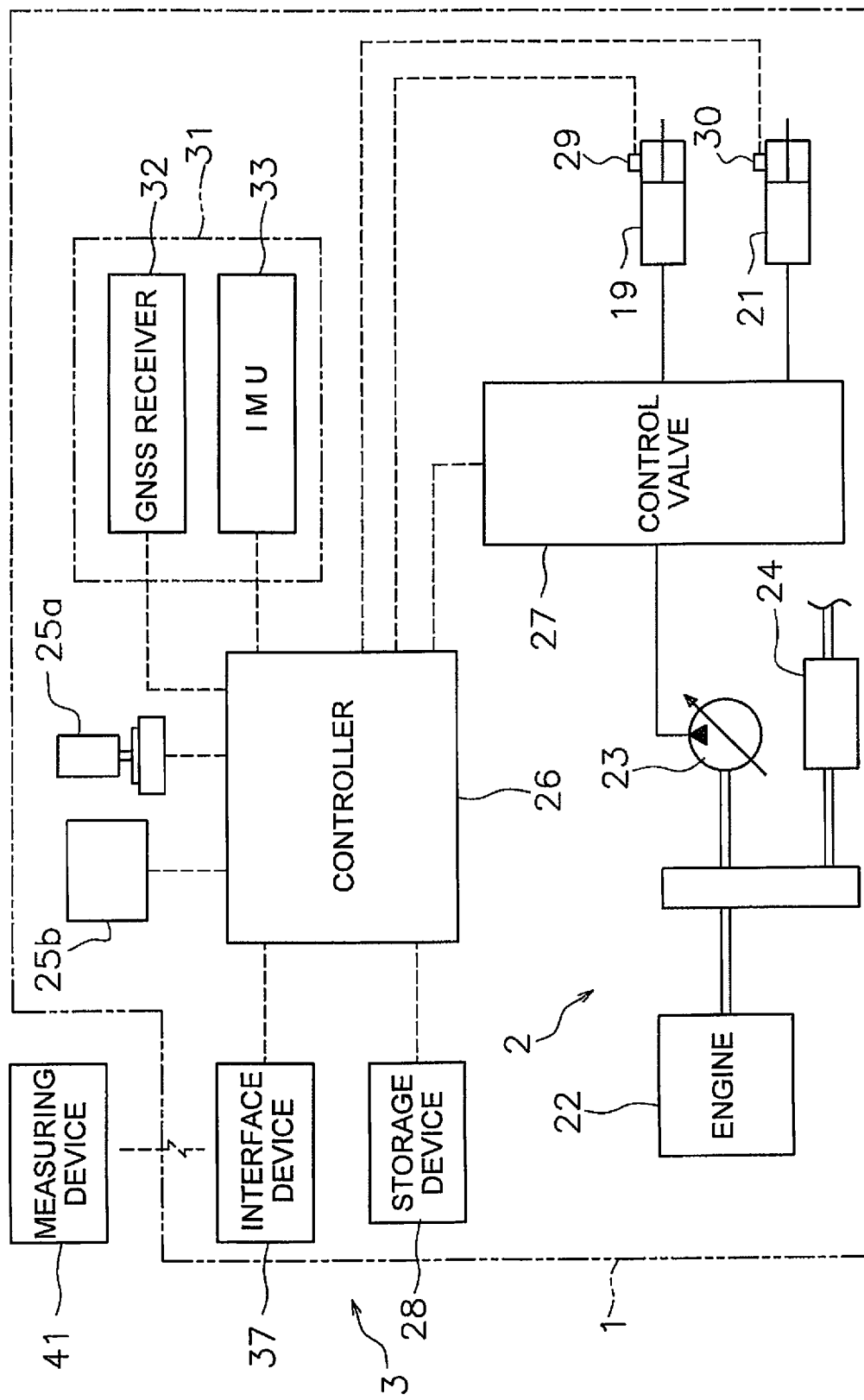
FIG. 23 is a block diagram of a configuration of a drive system and a control system of the work vehicle according to a second modified example.

The actual topography 50 may be obtained with another device and is not limited to being obtained with the above-mentioned positional sensor 31. For example, as illustrated in FIG. 23, the topography 50 may be obtained with an interface device 37 that receives data from an external device. The interface device 37 may wirelessly receive the actual topography data measured by an external measurement device 41. Alternatively, the interface device 37 may be a recording medium reading device and may receive the actual topography data measured by the external measurement device 41 via a recording medium.

The method for setting the virtual design plane 70 is not limited to the method of the above embodiment and may be changed. For example, the target design topography 70 is determined based on two preceding reference points from the starting point in the above embodiment. However, the target design topography 70 may be determined based on three or more preceding reference points from the starting point.

The controller 26 determines the target design topography 70 based on the average angle between the first reference topography C1 and the second reference topography C2 in the above embodiment. However, the determination is not limited to the average angle and the controller 26 may determine the target design topography 70 by implementing a process such as weighting with the angle of the first reference topography C1 and the angle of the second reference topography C2.

The controller 26 determines the second target design topography 70_2 during the work on the first target design topography 70_1 and before reaching the next starting position S1 in the above embodiment. However, the controller 26 may determine the second target design topography 70_2 upon reaching the next starting point S1.

Figure 24:
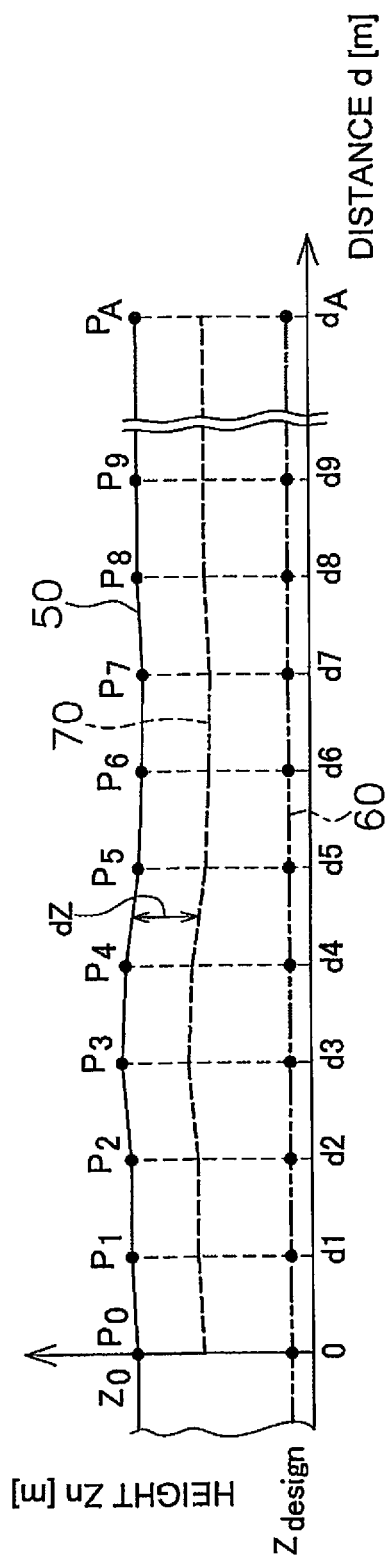
FIG. 24 illustrates a process for determining the target design topography according to another embodiment.

Alternatively, the controller 26 may determine the target design topography 70 with another method. The controller 26 may determine the target design topography 70 by displacing the actual topography 50 in the vertical direction. For example, as illustrated in FIG. 24, the controller 26 may determine the target design topography 70 by displacing the actual topography 50 in the vertical direction by a target displacement dz. The target displacement dz may be determined in accordance with a parameter such as the machine capacity of the work vehicle 1 or the load received by the work vehicle 1. The target displacement dz may also be set with the input device 25b.

In the above embodiment, the controller 26 determines the initial value of the target tilt angle so as to match the final design topography 60. However, the controller 26 may determine the initial value of the target tilt angle irrespective of the final design topography 60. For example, the controller 26 may use a previously set value as the initial value of the target tilt angle. Alternatively, the input device 25b may be used to allow optional setting of the initial value of the target tilt angle.

Figure 25A:
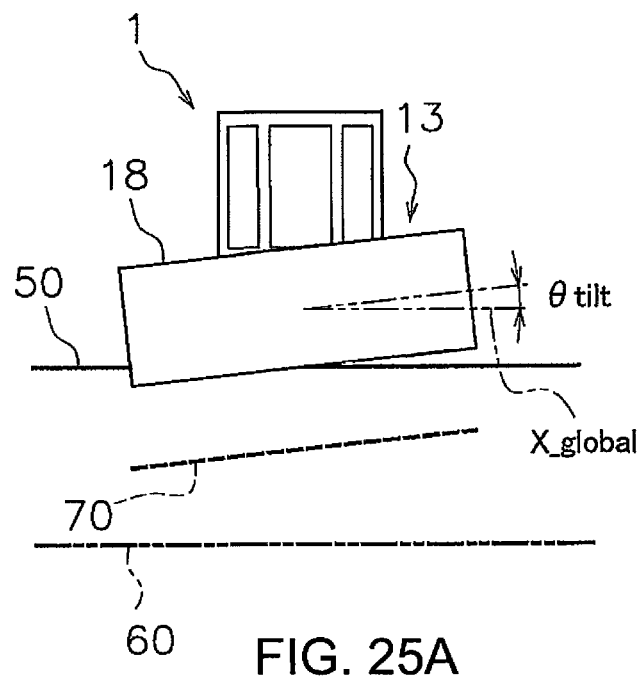
FIG. 25A and FIG. 25B illustrate a first example of a first tilt angle control.
Figure 25B:
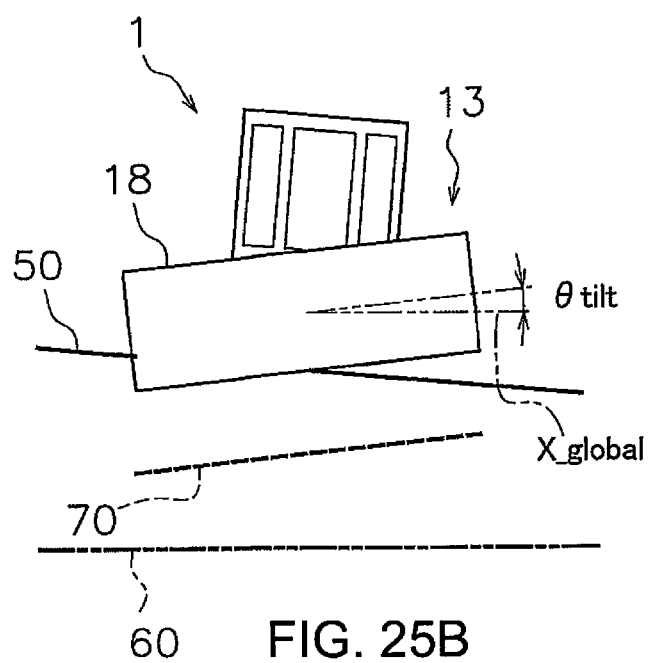

The controller 26 may control the work implement 13 so as to maintain the tilt angle θtilt of the blade 18 at the target tilt angle in the global coordinate system. That is, as illustrated in FIG. 25A, the controller 26 may control the work implement 13 so as to maintain, at the target tilt angle, the tilt angle θtilt of the blade 18 with respect to the horizontal direction X_global. In this case, as illustrated in FIG. 25B, even if the actual topography 50 is inclined and the attitude of the work vehicle 1 is tilted in the vehicle width direction, the attitude of the blade 18 in the global coordinate system can be constantly maintained.

Figure 26A:
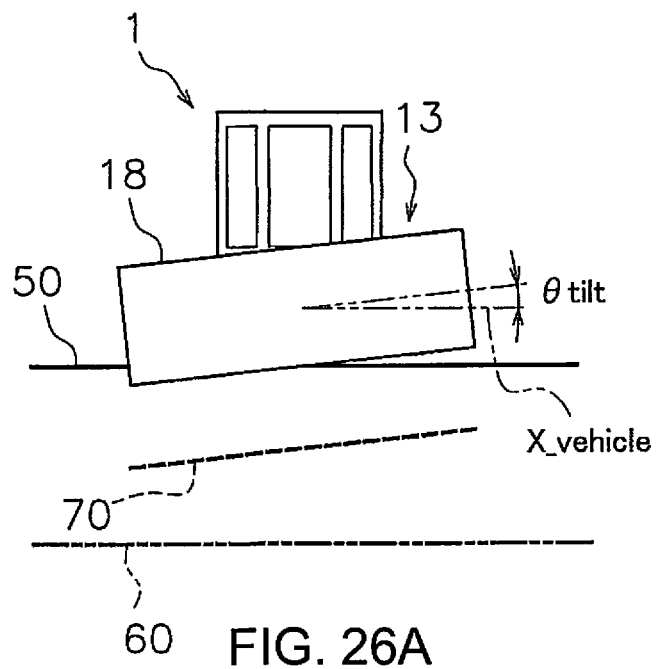
FIG. 26A and FIG. 26B illustrate a first example of a second tilt angle control.
Figure 26B:
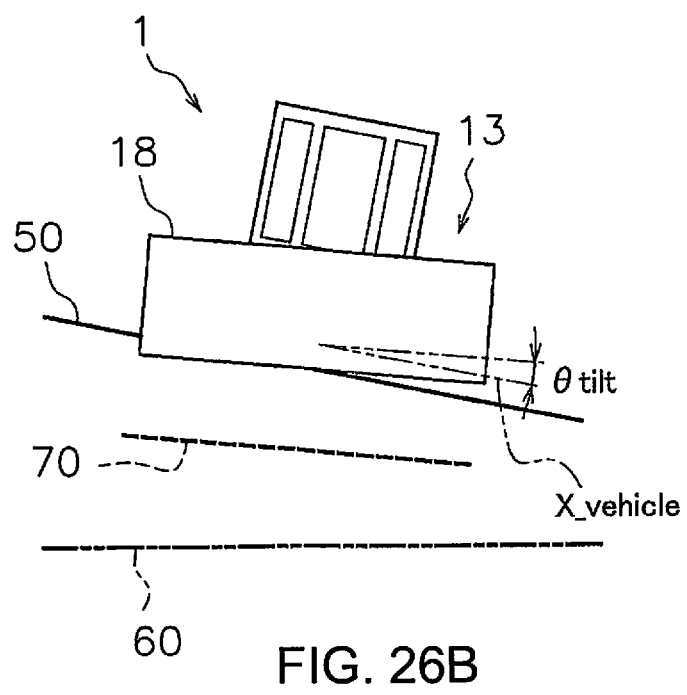

However, the controller 26 may control the work implement 13 so as to maintain the tilt angle θtilt of the blade 18 at the target tilt angle in the local coordinate system of the work vehicle 1. That is, as illustrated in FIG. 26A, the controller 26 may control the work implement 13 so as to maintain, at the target tilt angle, the tilt angle Atilt of the blade 18 with respect to the vehicle width direction X_vehicle with respect to the work vehicle 1. In this case, as illustrated in FIG. 26B, even if the actual topography 50 is inclined and the attitude of the work vehicle 1 is tilted in the vehicle width direction, the attitude of the blade 18 with respect to the work vehicle 1 can be constantly maintained.

The controller 26 may switch between a first tilt angle control for maintaining the tilt angle θtilt of the blade 18 at the target tilt angle in the global coordinate system, and a second tilt angle control for maintaining the tilt angle θtilt of the blade 18 at the target tilt angle in the local coordinate system of the work vehicle 1. For example, the controller 26 may switch between the first tilt angle control and the second tilt angle control in response to an operation of the input device 25b.

When the traveling direction of the work vehicle 1 is reversed, the controller 26 controls the work implement 13 so that the target tilt angle is reversed to the left and right while maintaining an absolute value of the target tilt angle with respect to the vehicle body 11. For example, after the work vehicle 1 travels from the front to the back (outward path) with respect to the drawing surface in FIG. 27A, the traveling direction is reversed, and the work vehicle 1 travels from the back side toward the front (return path) with respect to the drawing surface in FIG. 27B.

Figure 27A:
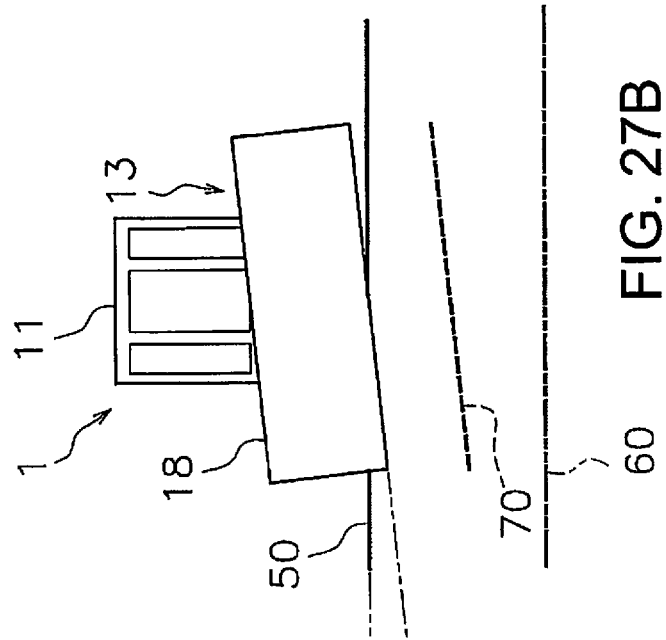
FIG. 27A and FIG. 27B illustrate a second example of the first tilt angle control.
Figure 27B:
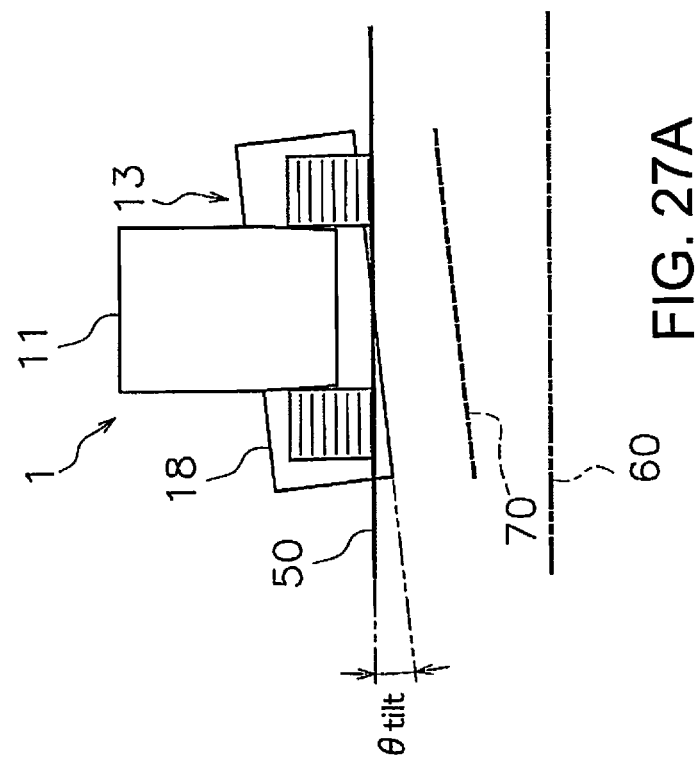

In this case, as illustrated in FIG. 27A, the controller 26 controls the work implement 13 so that the tilt angle θtilt is maintained at the target tilt angle with the left side pointing down with respect to the vehicle body 11 in the outward path. As illustrated in FIG. 27B, the controller 26 controls the work implement 13 so that the tilt angle Atilt is maintained at the target tilt angle with the right side pointing down with respect to the vehicle body 11 in the return path. Consequently, the attitude of the blade 18 in the global coordinate system is maintained.

Even when the traveling direction of the work vehicle 1 is reversed, the controller 26 may control the work implement 13 so as to maintain the target tilt angle with respect to the vehicle body 11. For example, after the work vehicle 1 travels from the front to the back (outward path) with respect to the drawing surface in FIG. 28A, the traveling direction is reversed and the work vehicle 1 travels from the back side toward the front (return path) with respect to the drawing surface in FIG. 28B.

In this case, as illustrated in FIG. 28A, the controller 26 controls the work implement 13 so that the tilt angle θtilt is maintained at the target tilt angle with the left side pointing down with respect to the vehicle body 11 in the outward path. Then, as illustrated in FIG. 28B, the controller 26 controls the work implement 13 so that the tilt angle θtilt is maintained at the target tilt angle with the left side pointing down with respect to the vehicle body 11 in the return path.

The controller 26 may switch between the first tilt angle control for reversing the target tilt angle to the left and right while maintaining an absolute value of the target tilt angle with respect to the vehicle body 11 when the traveling direction of the work vehicle 1 is reversed, and the second tilt angle control for maintaining the target tilt angle with respect to the vehicle body 11 even if the traveling direction of the work vehicle 1 is reversed. For example, the controller 26 may switch between the first tilt angle control and the second tilt angle control in response to an operation of the input device 25b.

Figure 29:
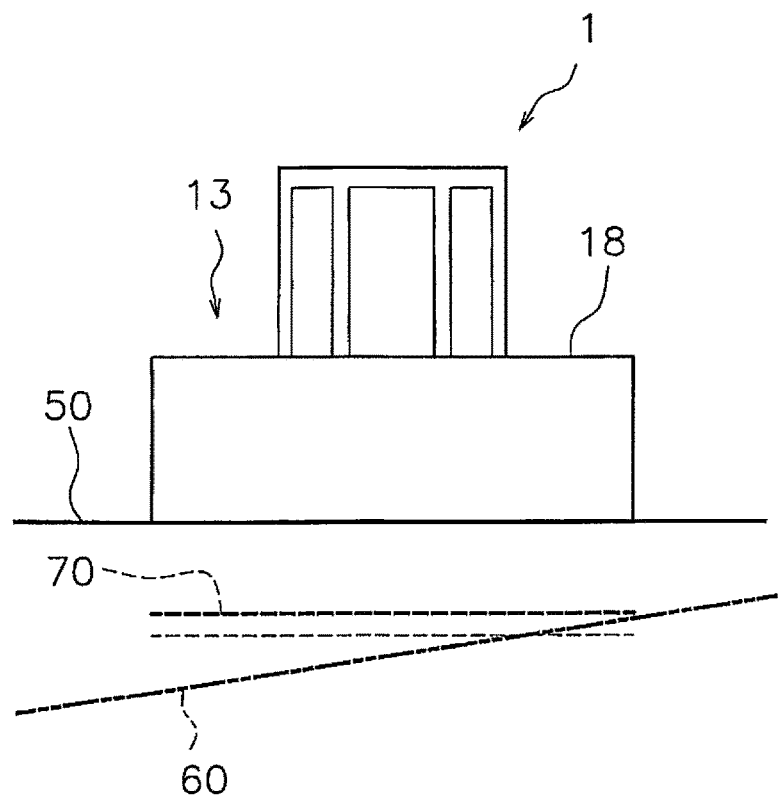
FIG. 29 illustrates a correction method for the target design topography according to another embodiment.
Figure 30:
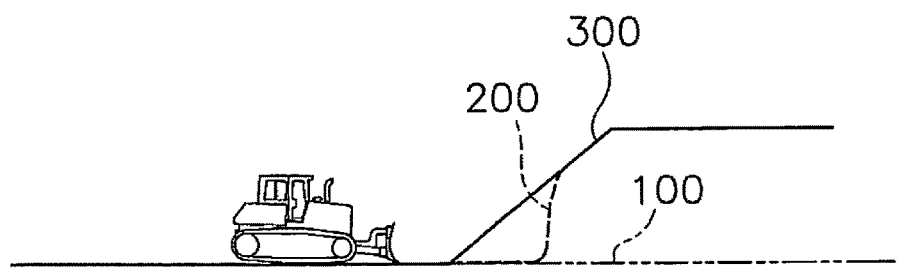
FIG. 30 illustrates excavation work according to the prior art.

In the present embodiment, when at least a portion of the target design topography 70 exceeds the final design topography 60, the target tilt angle is corrected so that the target design topography does not exceed the final design topography 60. However, the controller 26 may correct the target design topography 70 so as to not exceed the final design topography 60 using another method. For example, as illustrated in FIG. 29, the position of the target design topography 70 may be corrected upward so that the target design topography 70 does not exceed the final design topography 60.

According to the present invention, a work vehicle can be made to perform work efficiently and with a good finish quality with automatic control.

The invention claimed is:

1. A control system for a work vehicle including a work implement, the control system comprising
   a controller that controls the work implement, the controller being configured to obtain a final design topography,
      determine a target design topography, at least a portion of the target design topography being positioned above the final design topography,
      generate a command signal to operate the work implement in accordance with the target design topography,
      determine whether at least a portion of the target design topography is positioned below the final design topography,
      change the target design topography such that an entirety of the target design topography is positioned at or above the final design topography when it is determined that at least a portion of the target design topography is positioned below the final design topography, and
      control the work implement in accordance with the command signal such that the work implement follows the target design topography.

2. The control system for a work vehicle according to claim 1, wherein
   the controller is further configured to
      determine a target tilt angle,
      generate the command signal to operate the work implement in accordance with the target design topography at the target tilt angle.

3. The control system for a work vehicle according to claim 1, wherein
   the controller is configured to change the target tilt angle to change the target design topography such that the entirety of the target design topography is positioned at or above the final design topography.

4. The control system for a work vehicle according to claim 3, further comprising:
   an operating device that outputs an operation signal indicating an operation by an operator,
   the controller being further configured to
      receive the operation signal from the operating device,
      when the tilt angle of the work implement is changed due to an operation of the operating device, correct the target tilt angle of the work implement in accordance with the changed tilt angle, and
      when at least a portion of the target design topography is positioned below the final design topography, prioritize
         correcting the target tilt angle so that the entire target design topography is positioned at or above the final design topography, over
         correcting the target tilt angle according to the operation of the operating device.

5. The control system for a work vehicle according to claim 2, wherein
   the controller is further configured to determine an initial value of the target tilt angle in accordance with the final design topography.

6. The control system for a work vehicle according to claim 1, wherein
   the target design topography indicates a target shape of a topography.

7. A control system for a work vehicle including a work implement, the control system comprising
   a controller that controls the work implement, the controller being configured to obtain a first design topography,
      determine a second design topography, at least a portion of the target design topography being positioned above the first design topography,
      determine a target tilt angle,
      generate a command signal to operate the work implement in accordance with the second design topography at the target tilt angle, and
      change the second design topography when at least a portion of the second design topography is positioned below the first design topography,
   the controller being further configured to determine an initial value of the target tilt angle in accordance with the first design topography so that the work implement becomes parallel to the first design topography.

8. A method executed by a controller for controlling a work vehicle including a work implement, the method comprising:
   obtaining a final design topography;
   determining a target design topography, at least a portion of the target design topography being positioned above the final design topography;
   generating a command signal to operate the work implement in accordance with the target design topography;
   determining whether at least a portion of the target design topography is positioned below the final design topography;
   changing the target design topography such that an entirety of the target design topography is positioned at or above the final design topography when it is determined that at least a portion of the target design topography is positioned below the final design topography; and
   controlling the work implement in accordance with the command signal such that the work implement follows the target design topography.

9. The method according to claim 8, further comprising:
   determining a target tilt angle,
   the generating the command signal to operate the work implement in accordance with the target design topography at the target tilt angle.

10. The method according to claim 9, wherein
the changing the target design topography such that an entirety of the target design topography is positioned at or above the final design topography includes changing the target tilt angle so that the target design topography is positioned at or above the final design topography.

11. The method according to claim 10, further comprising:
receiving an operation signal indicating an operation by an operator, from an operating device; and
when the tilt angle of the work implement is changed due to the operation of the operating device, correcting the target tilt angle of the work implement in accordance with the changed tilt angle,
when at least a portion of the target design topography is positioned below the final design topography,
correcting the target tilt angle so that the target design topography is positioned at or above the final design topography, is prioritized over
correcting the target tilt angle according to the operation of the operating device.

12. The method according to claim 9, further comprising:
determining an initial value of the target tilt angle in accordance with the final design topography.

13. The method according to claim 12, wherein
the determining the initial value of the target tilt angle includes determining the initial value of the target tilt angle so that the work implement becomes parallel to the final design topography.

* * * * *